United States Patent [19]
Takagi et al.

[11] Patent Number: 5,504,550
[45] Date of Patent: Apr. 2, 1996

[54] CAMERA WHICH PERFORMS PHOTOGRAPHIC ADJUSTMENTS BASED ON THE VISUAL LINE OF THE PHOTOGRAPHER

[75] Inventors: Tadao Takagi, Yokohama; Kouichirou Minamino, Machida, both of Japan

[73] Assignee: Nikon Corporation, Tokyo, Japan

[21] Appl. No.: 196,836

[22] Filed: Feb. 15, 1994

[30] Foreign Application Priority Data

Feb. 15, 1993 [JP] Japan .................................... 5-025173
Mar. 4, 1993 [JP] Japan .................................... 5-043561

[51] Int. Cl.⁶ .................................................. G03B 13/00
[52] U.S. Cl. ...................... 354/195.1; 354/62; 354/219
[58] Field of Search ........................ 354/62, 219, 195.1, 354/222, 286

[56] References Cited

U.S. PATENT DOCUMENTS 5,245,371  9/1993  Nagano et al. ............................ 354/62
5,365,302  11/1994 Kodama .................................. 354/222

*Primary Examiner*—Russell E. Adams

[57] ABSTRACT

A camera having a visual line detection device, wherein camera control corresponds to the detection of the visual line of the photographer and on photographic information, such as focus and distance information, obtained through the photographic lens. Camera control can also correspond to the detected visual line and a selected program chart which provides shutter speeds and stop values to obtain specific picture effects.

18 Claims, 18 Drawing Sheets

AMOUNT OF MOVEMENT OF PURKINJE IMAGES

CAMERA WHICH PERFORMS PHOTOGRAPHIC ADJUSTMENTS BASED ON THE VISUAL LINE OF THE PHOTOGRAPHER

BACKGROUND OF THE INVENTION

1. Field of the Invention

The present invention relates to cameras having a visual line detection system and, more particularly, to cameras performing photographic adjustments based on the detection of a visual line of the photographer.

2. Description of the Related Art

In a camera as disclosed in JP-B-2-32312 (Japanese Examined Patent Publication 2-32312), a visual line position of a photographer is detected and fixed. Then, based on the detected visual line position, camera adjustments, such as focus adjustment and automatic exposure, are controlled.

However, the present invention recognizes that photographic conditions are not considered in the control of camera adjustments of a camera as disclosed in JP-B-2-32312 and, therefore, photograph quality in actual use conditions is poor.

SUMMARY OF THE INVENTION

Accordingly, it is an object of the present invention to provide a camera with a visual line detection device such that photographic conditions are properly considered when camera adjustments are controlled.

Additional objects and advantages of the invention will be set forth in part in the description which follows, and, in part, will be obvious from the description, or may be learned by practice of the invention.

The following objects of the present invention are achieved by providing a camera having: (1) a photographic lens for relating photographic information based on photographic circumstances; (2) a visual line detection unit for detecting the visual line of a photographer; and (3)photographic control means for controlling a camera operation based on the visual line detected by the visual line detection unit and the photographic information obtained by the photographic lens.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
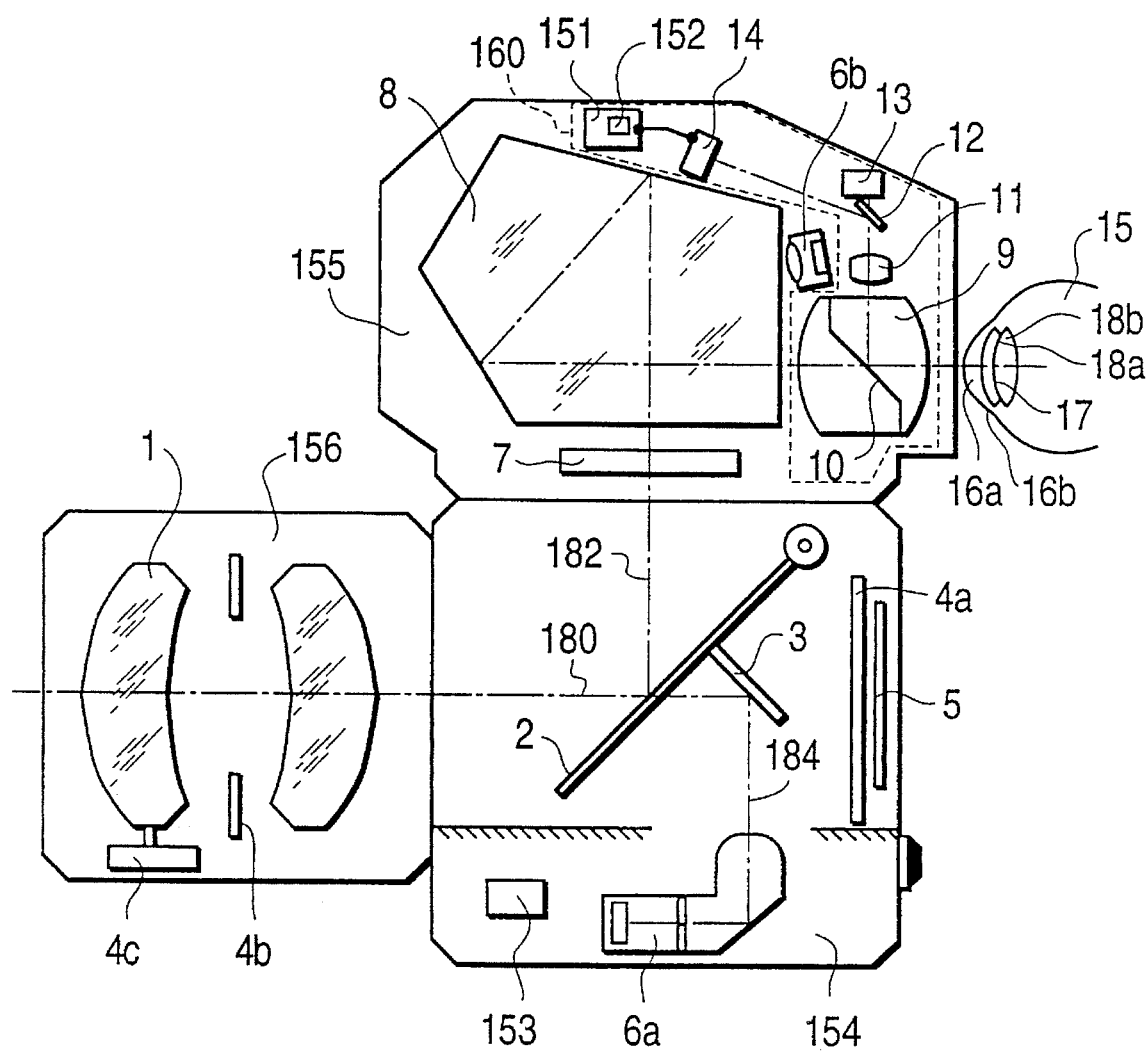
FIG. 1 is an optical cross-sectional view showing an embodiment of a camera according to the present invention.

Reference will now be made in detail to the present preferred embodiments of the present invention, examples of which are illustrated in the accompanying drawings, wherein like reference numerals refer to like elements throughout.

FIG. 1 shows an embodiment of a single lens reflex camera according to the invention. However, it is also possible to apply the present invention to cameras other than single lens reflex cameras in which the photographic light path and the viewfinder light path are arranged separately.

The camera of the present embodiment is a detachable viewfinder interchange type of camera, with a whole body portion 154 and a viewfinder 155.

Stop 4b and drive mechanism 4c move objective lens 1 in the direction of the optical axis for focusing and are located in photographic lens 156 mounted on the front side of body portion 154. Objective lens 1 is shown as a two-element lens but, as is well known in the art, objective lens 1 is in most instances a multi-element lens.

Main mirror 2, residing in body portion 154, is either disposed obliquely to the photographic light path or withdrawn from the photographic light path in response to an observational state and a photographic state. Sub-mirror 3 is used to reflect, in a downward direction of body portion 154, a light beam which has passed through main mirror 2. Shutter 4a exposes, at a prescribed time, the light receiving surface of photosensitive member 5. Focus detection device 6a determines the focal point of a photograph subject.

Microcomputer 153, disposed in body portion 154, takes charge of the control of focus detection device 6a, shutter 4a, stop 4b, drive mechanism 4c and the like.

Microcomputer 151, memory element 152 and exposure value detection unit 6b are disposed in viewfinder portion 155. Microcomputer 151 controls visual line detection device 160, exposure value detection unit 6b and the like. Memory element 152 stores information relating to the deviation of the visual axis direction and direction of the point of scrutiny. Visual line detection device 160, discussed later, includes elements 9–14 and element 151.

Microcomputers 151 and 153 communicate with each other.

Photosensitive member 5, residing in body portion 154, is a silver salt film, a CCD or MOS type solid state photographic element, or a vidicon or similar type camera tube. If photosensitive member 5 is an electronic imaging device, an electronic shutter mechanism can be used in which a shutter is omitted.

Figure 2A:
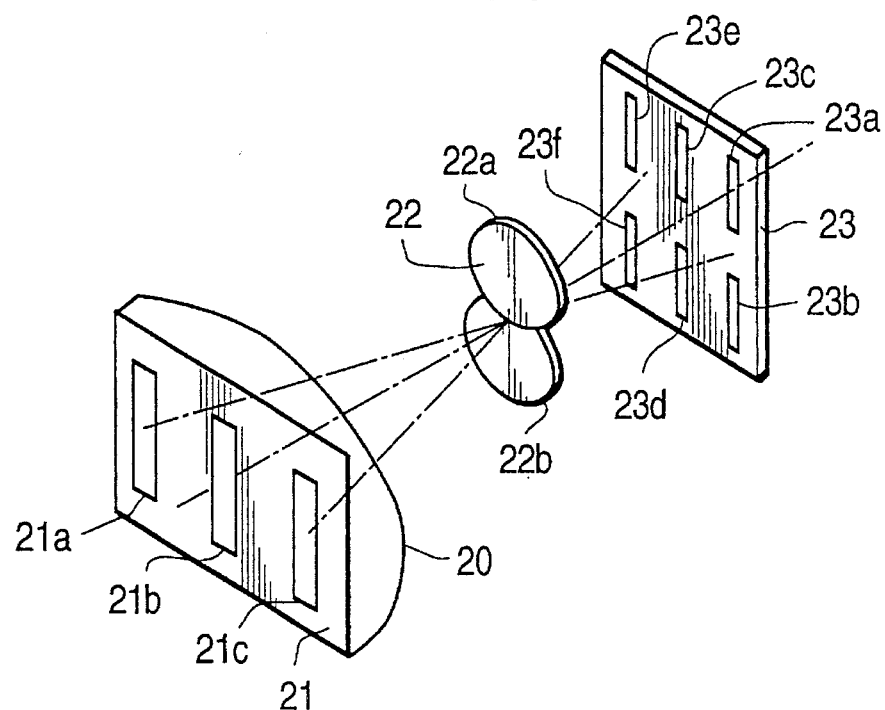
FIG. 2(A) is an oblique view showing a focus detection device of the embodiment of a camera according to the present invention.

FIG. 2(A) illustrates focus detection device 6a having field lens 20, aperture visual field mask 21, and a secondary imaging lens 22 comprising two positive lenses 22a and 22b side by side. Light illuminates photoelectric element array 23 comprising plural arrays of light receiving devices 23a–f. Field lens 20 is close to sub-mirror 3 and is disposed in the prearranged imaging surface of objective lens 1.

Referring to FIG. 2(A), slits 21a, 21b, and 21c of multiple aperture field mask 21 determine respective rangefinding visual fields, which secondary imaging lenses 22 reimage. For example, a portion of the field image demarcated by slit 21a is re-imaged approximately facing the photoelectric pair of element arrays 23a and 23b. Moreover the portions demarcated by slit 21b or the slit 21c are approximately re-imaged on the pairs of photoelectric element arrays 23c and 23d, or 23e and 23f, respectively. The received light information of each pair of photoelectric arrays is read out as electrical signals, correlation calculations are performed, and a value representing the focus adjustment state of objective lens 1 for the subject in the rangefinding field demarcated by each slit is calculated.

Moreover, it is also possible to adopt a focus detection device as disclosed in Japanese Patent Publication 61-160824, using longer than normal pairs of photoelectric element arrays. These photoelectric arrays are electrically partitioned, and correlation calculations may be performed using signals corresponding to neighboring partition regions.

In the above manner, focus detection device 6a is able to detect the focus for plural positions of the photographic visual field. Further details of the embodiment of the focus detection device of FIG. 2(A) are disclosed in Japanese Patent Publication 62-315490.

Figure 3:
FIG. 3 is a plan view of a light receiving surface of a light receiver for an embodiment of a camera according to the present invention.

Exposure value detection unit 6b of FIG. 1 has an imaging lens and a light receiver whereby sectional photometry is possible. The imaging lens is connected together in relation to focusing plate 7 and a light receiver (not illustrated) disposed in the target imaging surface of objective lens 1 via the optical path in pentaprism 8. The light receiving surface of the light receiver is partitioned, for example, as shown in FIG. 3, and photometry is possible in each partitioned region. The output of the light receiver is input to microprocessor 151 and the weightings of the output can be modified to have a photometric sensitivity distribution centered on plural central points. Next, ocular lens 9 is arranged in the after direction of the projection surface of pentaprism 8, used to modify the viewfinder optical path. A light path exists from observer's eye 15 through ocular lens 9 to focusing plate 7. A Fresnel lens may be disposed adjacent to or integral with focusing plate 7. Light partitioning unit 10, used in visual line detection device 160, comprises, for example, a dichroic mirror reflecting infrared light disposed in ocular lens 9. Other components of the visual line detection device include condensing lens 11, light partitioning unit 12 (such as a half mirror), and an illumination source 13 (such as a LED that preferably emits infrared light or near infrared light). A light beam emitted by illumination source 13 projects along the viewfinder optical path as, for example, parallel light, by the power of condensing lens 11 and the rear surface of ocular lens 9.

When the observer looks into ocular lens 9, the front portion of the observer's eye and photoelectric converter 14 are located in conjugate positions. An image magnification of one or less is preferable.

Figure 2B:
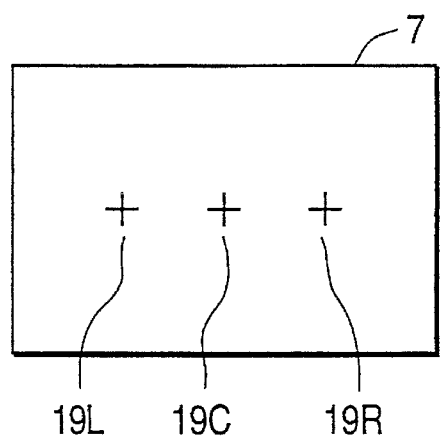
FIG. 2(B) is a plan view of focus detection points for a focus detection device for an embodiment of the camera according to the present invention.

In the above configuration, an image beam 180 passing through objective lens 1, partially transmitted via the main mirror 2, is divided into a viewfinder beam 182 and focus detection beam 184. The focus detection beam 184, after transmission through main mirror 2, is reflected by sub-mirror 3 and is incident on focus detection device 6a. Focus detection device 6a has, for example, three focus detection points 19L, 19C and 19R in the transverse direction in the photographic image plane of focusing plate 7, as shown in FIG. 2(B). During photography, main mirror 2 is raised upwards, sub-mirror 3 is folded flat against main mirror 2, and shutter 4a is opened and closed, thus exposing photosensitive member 5 for a prescribed time.

On the other hand, the viewfinder optical path is incident on pentaprism 8 via focusing plate 7. A Fresnel lens (not illustrated), integral with or separate from focusing plate 7, is also disposed in the vicinity of pentaprism 8. A light beam, through ocular lens 9, forms a subject image on focusing plate 7 and is incident on the observer's eye as an enlarged projection.

Figure 4:
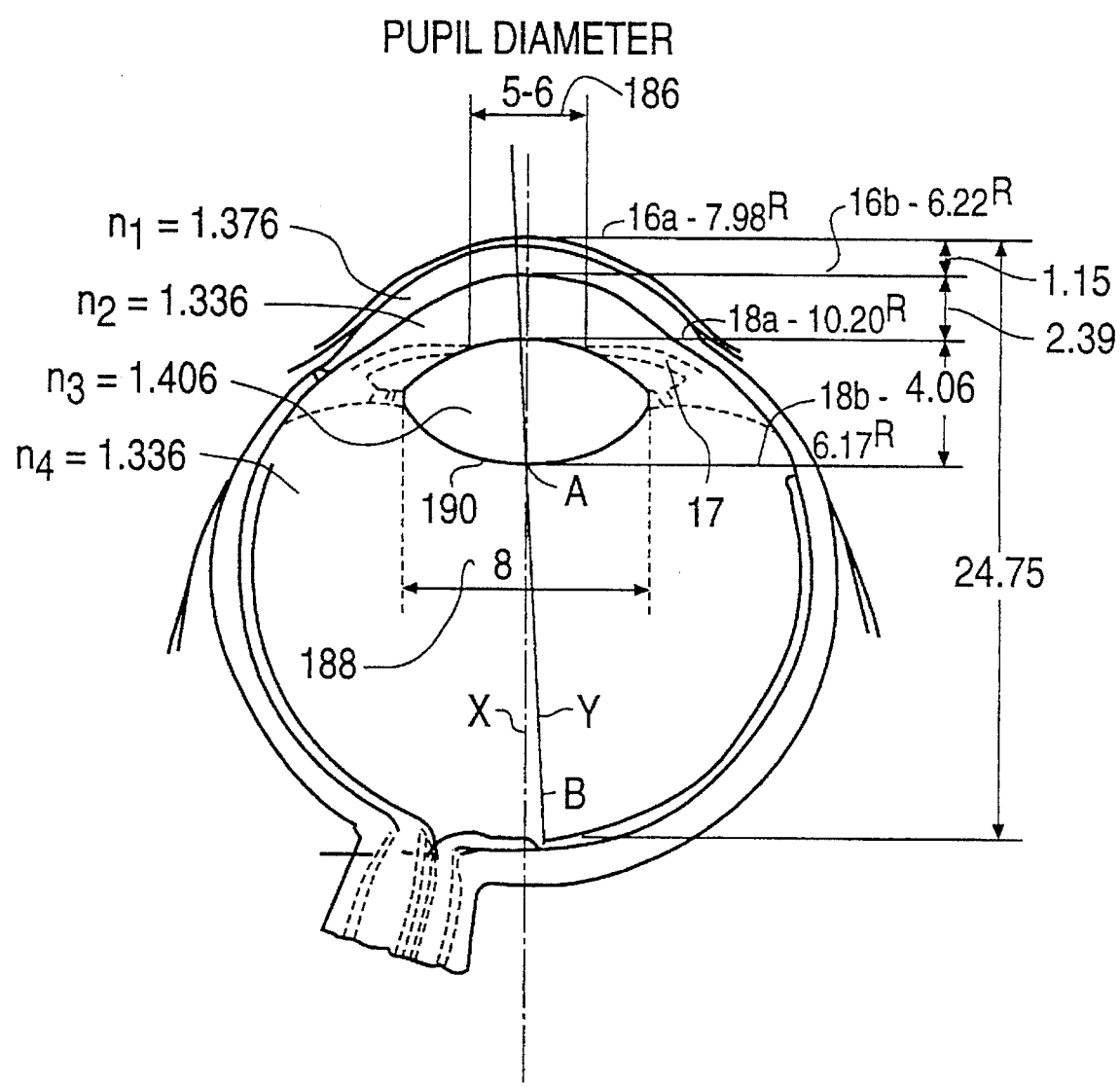
FIG. 4 is an illustrative view of a human eye.

FIG. 4 is a standardized diagram of a human eye illustrating various measurements. For example, the pupil diameter 186 is equal to approximately 5 to 6 mm. The diameter 188 of crystalline lens (aqueous humor) 190 is equal to approximately 8 mm. The human eye can be considered as a compound lens, with corneal front surface 16a, corneal rear surface 16b, front surface 18a of crystalline lens 190, and rear surface 18b of crystalline lens 190 as junction surfaces or boundary surfaces; iris 17 is close to the front surface of crystalline lens 190. FIG. 4 indicates the refractive index of each part. For example, the corneal refractive index, $n_1$, is equal to 1.376. FIG. 4 also indicates the radius of curvature for various parts. For example, the radius of curvature of corneal front surface 16a is equal to 7.98 (shown as $7.98^R$ in FIG. 4). The optical axis is referenced by "X" and the direction of a point of scrutiny (visual line) is represented by "Y."

There is generally a constant deviation between the direction of the optical axis X and the direction Y of a point of scrutiny (visual line). Usually, the direction Y of the point of scrutiny is to the fovea B, on a line joined to the nodal point A of the front portion of the eye. In the case of photoelectrically detecting the movement of the eyeball, using the axial symmetry of the eyeball optical system, detection of the optical axis X is relatively easy. However, such detection is inappropriate without correcting for the deviation of the direction of the point of scrutiny when high accuracy is required. Methods of correction are mentioned below.

The optical path of the visual line detection device 160 is as follows, with reference again to FIG. 1. Illumination emitted by illumination source 13, via half mirror 12, is collimated to some degree by a condensing lens 11, reflected by mirror 10 and is incident on the optical path of the viewfinder 155. Light partitioning unit 10 is a dichroic mirror which transmits the viewfinder light of the visible region coming from the subject, and reflects the illuminating light of the infrared region; this is desirable both from the standpoint of clarity of viewfinder 155 and from the standpoint of the illuminating efficiency of visual line detection device 160. If an infrared source of sufficiently high luminosity is used as illumination source 13, set to allow for a decreasing illuminating efficiency, it is possible to substitute a ND half mirror.

The infrared light introduced into the viewfinder light path passes through the rear surface of ocular lens 9 and illuminates the observer's eyeball. Even if the position of the observer's eye changes, the illumination conditions are maintained such that illuminating light incident on the eyeball is an approximately parallel one-way ray. This can be effected by adjusting the power disposition of each portion so that the entire power of condensing lens 11 and the rear surface of ocular lens 9 is realized.

There is a change in refractive index at each boundary surface of the human eye. The illumination is reflected with an intensity of magnitude in the order: corneal front surface 16a, the front and rear surfaces of the crystalline body 190, and the corneal rear surface 16b. Moreover the position of the reflected image of each boundary surface when a parallel beam is incident, when seen from the forward direction of the eyeball, will be understood from the result of paraxial ray tracing as in FIG. 5. These images are termed the Purkinje images, and are called the first, second, third, etc. Purkinje images, from the front surface of the cornea in sequence.

Figure 5:
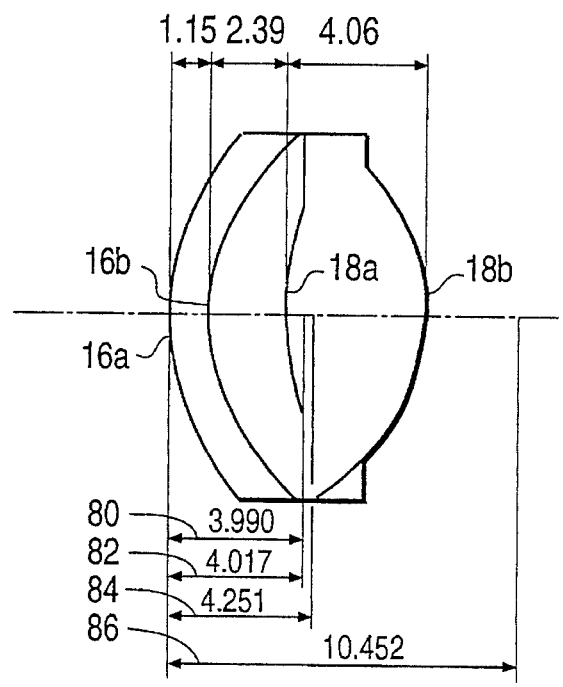
FIG. 5 is a cross-sectional view of a model eye.

FIG. 5 is an illustration of a model eye, indicating a distance 80 to a first surface reflection, a distance 82 to a second surface reflection, a distance 84 to a third surface reflection and a distance 86 to a fourth surface reflection. As illustrated in FIG. 5, a third Purkinje image is concentrated directly after the front surface 18a of crystalline lens 190; moreover, from consideration of the previous refractive index changes, the strong reflected images are in the sequence of the first image, fourth image and second image. Because the illuminating light which forms these images is in the infrared wavelength region, the light is not perceived in the eye and there is no interference with observation of a subject image in viewfinder 155. It is desirable for the wavelength of the illuminating light to be 700 nm or longer; furthermore, at 750 nm or more, sensitivity differences between individuals are negligible and the light is not sensed by the human eye.

By tracing the reverse path of the light, it can be seen that light reflected by the observer's eye 15, via mirror 10, condensing lens 11 and reflected by half mirror 12, is received in photoelectric converter 14. The reflected light is separated from the viewfinder light path; it is desirable to insert a visible cutoff, infrared transmission filter in the light path to photoelectric converter 14. The cutting off of the cornea reflected light according to the viewfinder image visible light is such that only the reflection of the infrared illumination light, which is significant as an optical signal, is photoelectrically converted. The photoelectric surface, with the total power of condensing lens 11 and the rear surface of ocular lens 9, is placed close to the front surface of crystalline lens 190 of the observer's eye 15, namely, in a position such as to be imaged close to the pupil. By this method, the first, second and fourth Purkinje images are received in an imaged state and are not always weak as a quantity of reflected light. Since light of the third image is defused because of defocusing the third image, this third image does not contribute significantly to the photoelectric conversion signal.

The principle actions of visual line detection device 160 of the present embodiment will be described below. In the device of FIG. 1, illumination source 13 acts as a point light source on focusing plate 7 at a position of the image plane center. This positioning occurs by generating light from a position optically equivalent to the position of 19C of FIG. 2(B). The position of luminating source 13 as a point of light source is adjusted, in this case to the optical axis of the observer's eyeball, if it passes through the image plane center since lumination source 13 is understood to be an illumination source on an extended line of the optical axis of the eyeball.

Figure 6A:
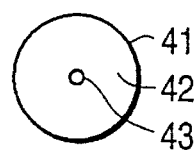
FIGS. 6(A),6(B) and 6(C) are diagrams showing the reflected images of an eye.
Figure 6B:
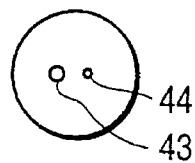
Figure 6C:
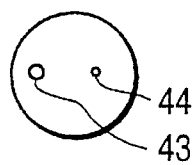

As shown in FIG. 3, each Purkinje image on the optical axis of the eyeball is aligned to be a point image in one straight line. When viewed from the forward direction, the eyeball aperture is shown in FIG. 6(A), with superposed Purkinje image 43 shown in relation to iris 41 and pupil 42. A brightly illuminated iris is observed to be ring shaped; in dim light, the Purkinje image of each surface at the center of pupil 42 of circular form is a superposed bright spot, one spot being observed. On the other hand, when the eyeball rotates to the right or left and the visual line is directed in an inclined direction, each Purkinje image moves to a position deviated from the center of the pupil since the illuminating light is incident obliquely to the eyeball optical axis. Furthermore, the direction and amount of movement differs according to the reflection surface with plural Purkinje images 43, 44, etc. being observed when viewed from a forward direction, as shown in FIG. 6(B). If the optical axis of the observer's eye is seen to be in a position further separated from the image plane center, as in FIG. 6(C), this trend is still stronger. Moreover, the observer's eye is seen in the reverse direction and the direction of movement of the Purkinje images is also reversed.

Figure 7:
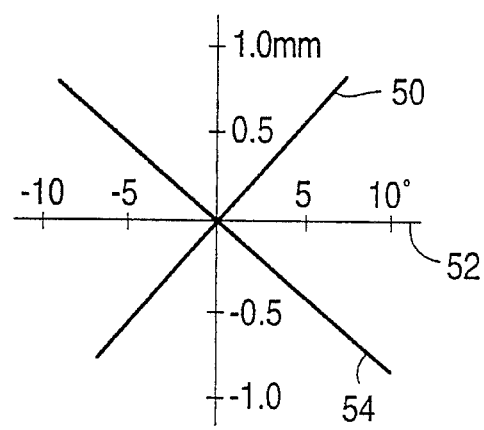
FIG. 7 is a graph showing the movement of the Purkinje image.

FIG. 7 illustrates the movement of Purkinje images in relation to eyeball rotation. A first Purkinje image is represented by line 50 and a fourth Purkinje image is represented by line 54. Line 52 represents the eyeball rotation axis. For the angle of rotation of the observer's eye, the first and fourth Purkinje images become strong reflected images with the amount of movement shown. If the movement of these Purkinje images is photoelectrically determined, the direction of the visual line can be detected.

In the above-described visual line detection method, it is necessary to account for parallel movement of the eyeball. Generally the viewfinder system of a camera is designed such that if the observer's pupil is present in a fixed tolerance region relative to the ocular lens aperture position, the whole image plane is surveyed. Actually, when this region is narrow, the positional relationship between the camera and pupil has to be accurately maintained, making the camera very difficult to use. However, considering a standardization of visual line detection device 160, the position of the pupil in this tolerance region results in corresponding changes of the position of the Purkinje images. These changes require compensation. The method does not depend on the person and is relatively easy to implement from an optical standpoint.

(1) The position of the center of the pupil is normally determined, and the relative displacement of the Purkinje images from the center of the pupil is converted into a visual line detection amount. This method is easiest to do directly, but since the edge of the pupil (in other words, the boundary with the iris) has to be accurately picked up, a photoelectric element with a wide range of view is necessary.

(2) The relative displacement of position of two or more Purkinje images must be gauged. The first and the fourth images combined are relatively easy to detect. The positions at which the images are formed can be measured close to the same image plane, because they are comparatively strong reflected images.

The observer may need to change the viewing position on the focusing plane, but the eyeball rotation amount is at most $\pm 10°-15°$, so that the displacement of the Purkinje images is at most about $\pm 1$ mm. Since a relative parallel motion of the eyeball and camera many times this large is tolerated, a simple differential sensor for the movement of the visual line can be used. In contrast to this, visual line detection device 160 is constituted by an array of several photoelectric elements which measure the distribution of light in the vicinity of the pupil of the observer's eye. This distribution of light is numerically analyzed without effect on the position of the eyeball or the pupil diameter.

Figure 8A:
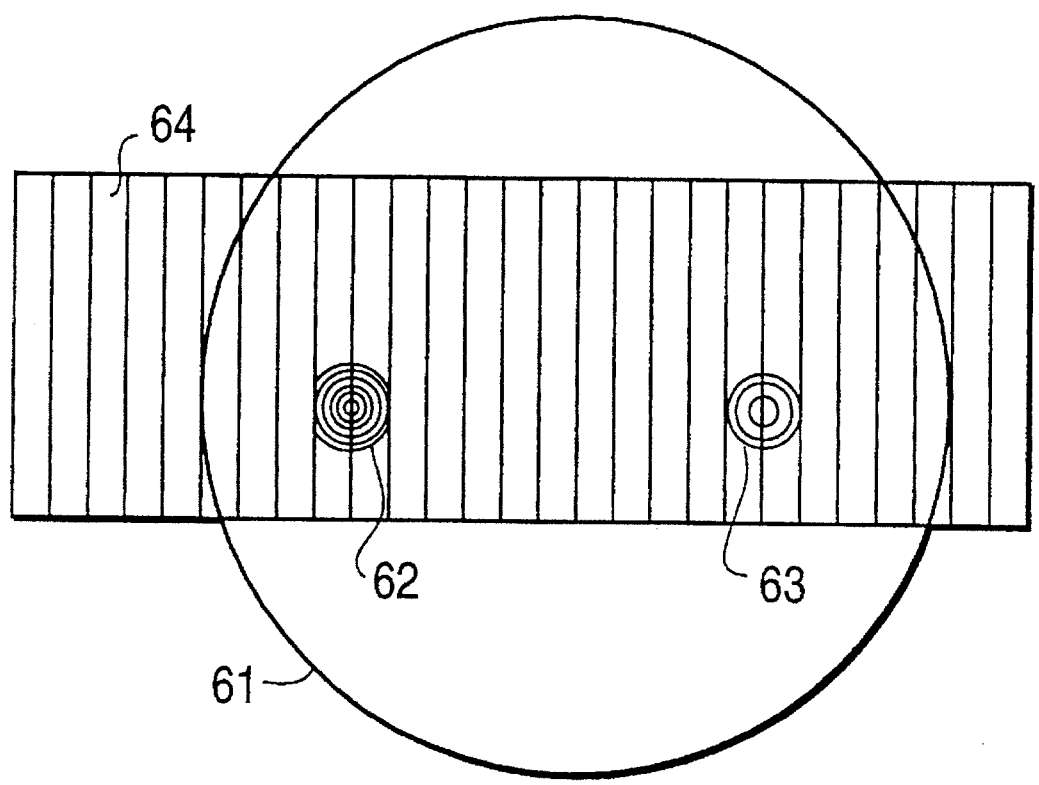
FIG. 8(A)is a diagram illustrating the detection of reflected images.

Since the visual line motion may be detected in only the transverse direction, a one-dimensional photoelectric element array can be used. FIG. 8(A) is a diagram illustrating this method, wherein detection ability in the vertical direction is disregarded. As a result, parallel motion of the eyeball in a vertical direction or rotation is not practically sensed by the longitudinal form, that is, one which consists of an array 64 of photoelectric elements whose vertical height is a multiple of the transverse width. A similar effect can be obtained with a cylindrical lens in contact in front of the array of photoelectric elements.

Figure 8B:
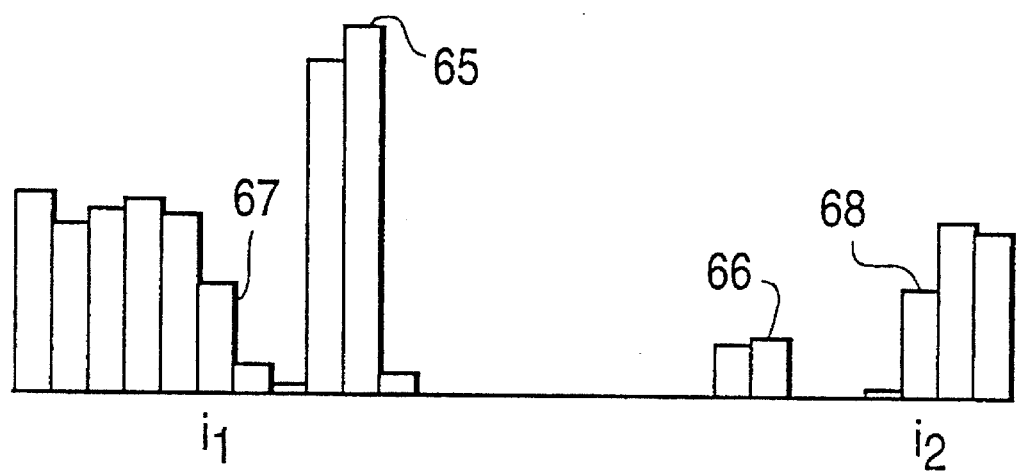
FIG. 8(B) is a graph showing photoelectric output signals for the images shown in FIG. 8(A).

When the first Purkinje image 62 and the fourth Purkinje image 63 shine into pupil 61, light is received by one-dimensional photoelectric array 64 (photoelectric converter 14) and a photoelectric output is obtained, as shown in FIG. 8(B). The high values on either side of FIG. 8(B) represent the iris. In the middle of the dark portion of the pupil, the signals 65 and 66 are obtained, respectively corresponding to the first and fourth Purkinje images.

The center of the pupil is obtained from positional information of the edge portions 67 and 68. In the edge portions, taking the pixel numbers as $i_1$ and $i_2$ having output close to the iris portion average half value, the position coordinate of the center of the pupil is given by:

$$i_0 = (i_1 + i_2)/2$$

Because the position of the first Purkinje image is found from the maximum peak locally present in the dark portion of the pupil, the mutual positional relationship of this position and the previous pupil center, the rotation circumstances of the eyeball and, accordingly, the direction of the visual line can be known from the graphical relationship shown in FIG. 7. In FIG. 7, the center of the pupil may be considered to be the origin of the graph for the amount of movement of the Purkinje images. When the origin is considered as fixed in the camera, the parallel motion of the eyeball appears negligible. The fourth Purkinje image is found as the second peak of the dark portion of the pupil; this position may be calculated using the previous first image position. At this time, it is not always necessary to know the position of the center of the pupil. However, because the first and fourth Purkinje images differ in intensity by a factor of ten or more, a photoelectric element with a high dynamic range is necessary.

A similar effect can be obtained by detection of the center position from the edge of the iris and pupil (the portion enveloped by the cornea), instead of detecting the center of the pupil. Using the iris and pupil to determine the center is highly accurate because, unlike the pupil, the brightness of the boundary does not change, but a wide detection range has to be used since the diameter becomes large.

As is clear from FIGS. 8(A) and 8(B), this method is insensitive in a direction perpendicular to the array direction of the elements in array 64. However, when constituted by photoelectric elements of excessive vertical length in the direction perpendicular to the array direction, there is a limit on the vertical length since the iris can be found in the up and down direction by the position of the pupil. Accordingly, plural photoelectric element arrays, comprising elements having a comparatively restricted vertical length, are placed in juxtaposition in the up and down direction. When the visual line is detected only by an array with which the most suitable output is obtained, this method is insensitive in the up and down direction and good Purkinje image signals are usually obtained. Moreover, as mentioned above, by detection with only a one-dimensional array, the illuminating light source is not a point light source, and signals are very conveniently obtained when the light source appears as a line, formed by a slit mask. In this case, a line light source may be constituted by a LED. In back of a slit mask, an infrared transmitting visible cutoff filter and a white light source may be placed in sequence.

Visual line detecting systems are known in the art, examples of which are disclosed in U.S. Pat. Nos. 5,036,347 and 5,182,443.

The output of photoelectric converter 14 of FIG. 1 is input to microcomputer 151 and the focus detection value of the rangefinding position corresponding to the observer's visual line direction is calculated by microcomputer 153 from the output of focus detection device 6a. According to the calculated value, objective lens 1 can be focused by driving the drive mechanism 4c.

In this manner, with the obtained visual line direction, a visual line controlled camera is obtained according to the present invention, changing the rangefinding point of the automatic focus detection. Because the position of the visual line is continuously found, the control object is not limited to three points as shown in FIG. 2(B).

Moreover, the output of exposure value detection unit 6b undergoes signal processing by microcomputer 151, the exposure conditions are determined with emphasis placed on a position according to the visual line direction of the observer, and shutter 4a and stop 4b can be arranged on one side or both sides, synchronizing with the release operation.

Then, while controlling the camera in the case in which plural point measurements are possible by both automatic focus detection and automatic exposure control, it is possible to use only one or both simultaneously, according to the observer's intentions. Moreover, apart from focus detection and exposure control, an indication can be given within the visual field of the viewfinder of shutter priority, stop priority, program photography and similar modes. By changing the position of the indication (for example, at the time of the first stage of release operation depression), photography can be performed in response to a visible mode indication.

A method is described below for correction of the deviation of the visual axis direction and the direction of scrutiny, which accounts for individual differences. Looking through ocular lens 9, rangefinding visual field marks 19C, 19R and 19L of the focusing plate 7 are shown in FIG. 2(B). For example, assume that the rangefinding visual field mark 19C of the observation visual field center is used. Preceding the measurement, the observer (the photographer) scrutinizes the rangefinding visual field mark 19C and, in this state, inputs the measurement starting signal from an input unit (not illustrated).

Visual line detection device 160 measures the visual axis of the observer's eye and the visual axis direction. For example, as previously described, the amount of displacement of the first Purkinje image relative to the center of the pupil, or the relative amount of displacement of the first Purkinje image and the fourth Purkinje image is quantized. Since it is a physiological characteristic that the direction of the visual line tends to change somewhat between individual people, signal processing software may be used that adopts the visual line direction generated at the highest frequency of occurrence during a given time.

The measurement results from the visual line detection device are stored in memory element 152 of microcomputer 151. Memory element 152 is desirably a non-volatile EEPROM, but is not limited to this; for example, it may be a RAM with a battery backup.

In this manner, the visual line direction is obtained while confirming the observer's scrutinization of the image plane center. In the framing time for photography, by calculating the relative difference of direction of the measured visual axis and the direction of the visual line when scrutinizing the center of the image plane, the scrutinized point on the picture is found. When represented by a numerical expression (for example, taking the pupil center point or the center point of the iris and pupil as a standard), if the position of the first Purkinje point is x, the direction X of the scrutinized point is represented by:

$$X = k(x - x_0) \quad \text{Eq. (1)}$$

Here $x_0$ is the x when the observer scrutinizes the center of the image plane; moreover, k is a constant of proportionality and is a constant, fixed as a principal factor, of the viewfinder system.

Furthermore, in order to increase the accuracy of detection, the following embodiment may be adopted.

Namely, some difference generally exists between the direction of scrutiny detected by the visual line detection system and the observer's actual direction of scrutiny. Accordingly, confirming the detection result, adjustment of the deviation is effective. If there is a large drift, a new detection may be carried out.

Figure 9A:
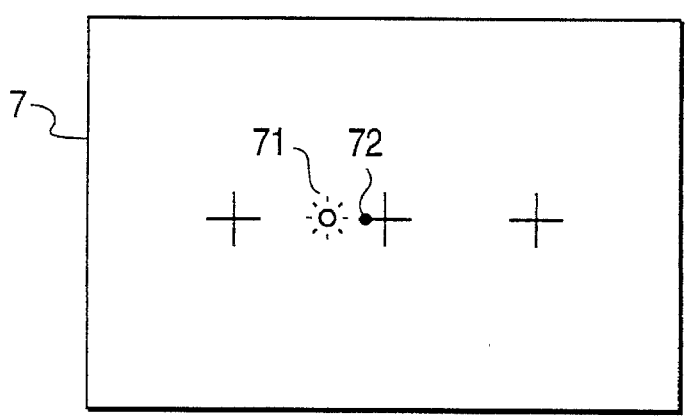
FIG. 9(A) is a plan view of a focusing plate.

Focusing plate 7 is illustrated in FIG. 9(A). The observation visual field may also appear in this manner. Indication mark 71 shows the detection result. For example, the display uses a liquid crystal display unit or EL display unit, laminated to the focusing plate, or an optical display unit illuminating a diffraction grating from the side. $x_0$ is preset to a suitable value.

Figure 9B:
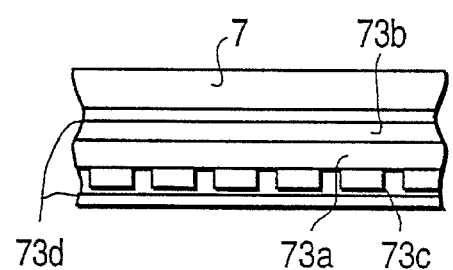
FIG. 9(B) is an enlarged cross-sectional view of a liquid crystal display unit affixed to a focusing plate.

FIG. 9(B) shows a portion of a liquid crystal display unit affixed to a focusing plate 7. Liquid crystal layer 73a is sandwiched between a uniform transparent electrode layer 73b and a transparent electrode layer 73c arranged in the form of discontinuous lines positioned between polarizing sheets 73d. The display becomes possible by connecting the electrodes of the transparent electrode layer 73c on the lower side in succession to an electric supply (not illustrated).

The observer looks through ocular lens 9 of viewfinder 155 and can observe display mark 71. When the desired subject (not illustrated) is scrutinized in the observation visual field, the detection is correct if the subject and the display mark are superposed. Nevertheless, if there is a drift of, for example, the subject or the central rangefinding mark position of the observer's subjective point of scrutiny 72 and the display mark 71, adjustment may be performed because error is present in the detection.

In the case of measuring the correction amount, a rangefinding mark was used in the above example. However, an indicator displayed, for example, at the center of the image plane, may be used. To draw attention to an indicator, the indicator can be made to blink.

Figure 10A:
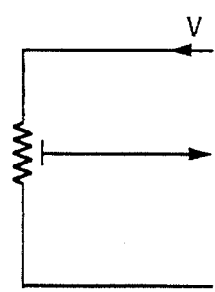
FIGS. 10(A) and 10(B) are views illustrating adjusting mechanisms for adjusting a visual line detecting device.
Figure 10B:
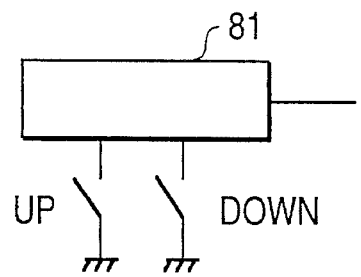

The constant $x_0$ of equation (1) above is changed by a dial of the input unit or a switch, until the position which the observer himself recognizes as the point of scrutiny and the position which the camera detects as the point of scrutiny are in coincidence. If the observer observes that his own subjective visual line and the detection display position of the camera are in coincidence, $x_0$ may be fixed at that position. $x_0$ can be input, for example, by operating a resistance type potential divider from a constant voltage supply, as shown in FIG. 10(A), with A/D conversion to correspond to $x_0$. Also, as shown in FIG. 10(B) for a digital example, the contents of built-in register 81 are moved up or down in two reciprocal directions by a switch. A display unit is necessary, but the observer is not required to secure a state of steadily viewing a standard point during measurement. This makes the camera easy to use.

In order to perform the highly accurate detection of the point of scrutiny, the correction of the drift of the visual axis direction and the direction of the point of scrutiny is provided. When the photographer changes, the amount of the drift subtly differs; however, the point of scrutiny display is effective as a countermeasure against this change. When the camera has the point of scrutiny display overlapping the photographic image plane in coincidence with the photographer's subjective point of scrutiny, the setting of the correction value can be left unchanged. When the user changes and the two are no longer in coincidence, the setting of the correction value may be performed again. At the time of the visual line detection action, if the display of the point of scrutiny is visible, it can instantaneously be decided by the photographer whether or not setting the correction value is necessary.

When a strict position of the point of scrutiny is not necessary, drift of the visual axis direction and the direction of the point of scrutiny not based on individual differences as a universal constant may be fixed in the circuit (for example, in the form of mask ROM). Moreover, the position at which the input point of scrutiny is displayed can also be confirmed.

By the above method, based on position information of the detected point of scrutiny of the observer's eye, performing automatic focus adjustment at the three points 19L, 19R and 19C in FIG. 2(B) is possible. Moreover, performing automatic exposure correction is possible. In the point of scrutiny detection of the above method, because position detection is possible continuously or at a very fine pitch, a moving subject is, of course, not limited to three points in FIG. 2(B).

Figure 11:
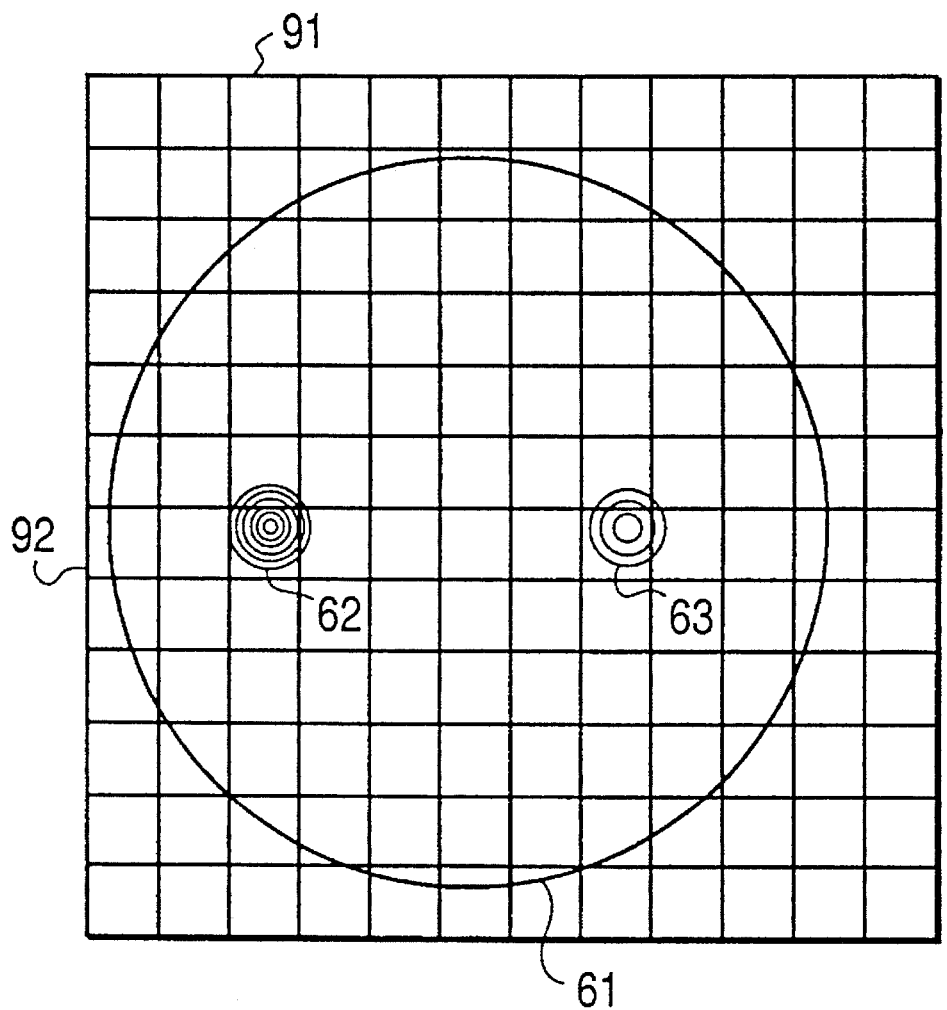
FIG. 11 is a diagram illustrating the 2-dimensional detection of reflected images.

Visual line detection has been described in terms of a one-dimensional direction. However, detection of the movement of the visual line may be not only in one direction but in two orthogonal directions using, for example, a photoelectric array of picture elements forming a square-like shape and arrayed 2-dimensionally, as shown in FIG. 11. If the height and width of a photoelectric array comprising horizontal array 91 and vertical array 92 are respectively selected to contain at least a first Purkinje image one-dimensional array (such as array 64 in FIG. 8(A)), the visual line position can be found by detecting the pupil center. As in FIG. 11, the optical image close to the pupil is imaged on a photoelectric array, comprising arrays 91 and 92, which has been arrayed in two dimensions, and the signals may be used from the vertical and horizontal arrays 92 and 91, respectively. Well-known CCD photographic elements, or MOS type photographic elements can be used. Moreover, the position of a Purkinje image can be easily determined if the image is selected to be vertically and horizontally shaped so that the points of intersection of the image with the photographic element indicate the origin of the image.

In the present embodiment, the method of correcting drift of the visual axis direction and the direction of the point of scrutiny is basically the same. Namely, average values are used from anatomical data of the human eye, correction amounts being built in beforehand, and the correction for the detected visual line direction is added. With (X, Y) as the direction of the point of scrutiny, $$X = k(x - x_0) \quad \text{Eq. (2a)}$$

$$Y = k(y - y_0) \quad \text{Eq. (2b)}$$

Here (x, y) is the position of the first Purkinje image, based on the pupil center or the center of the iris and pupil; $(x_0, Y_0)$ are the (x, y) when the observer is scrutinizing the image plane center.

In order to perform an even less accurate detection of the point of scrutiny, for each specific photographer, the correction amount $(x_0, Y_0)$ is detected. Accordingly, the direction of the visual axis is detected while scrutinizing the center of the image plane, or a correction adjustment is made such that the display of the detected position of the point of scrutiny is in coincidence with the photographer's subjective point of scrutiny, and the previously-mentioned methods can be used.

Figure 12:
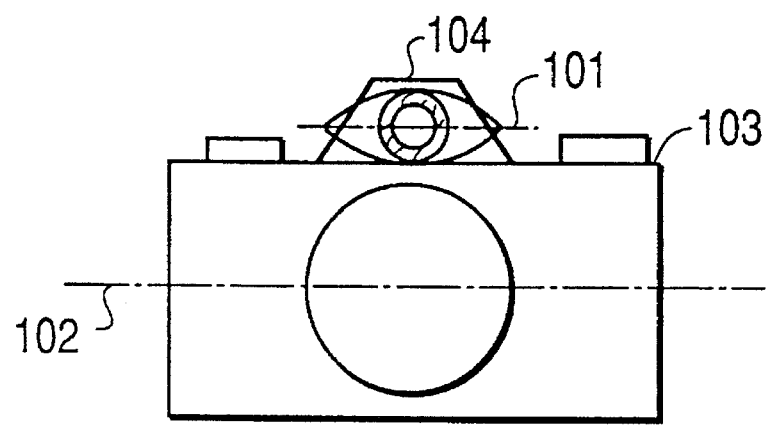
FIG. 12 is an illustration of a change of camera attitude.
Figure 13:
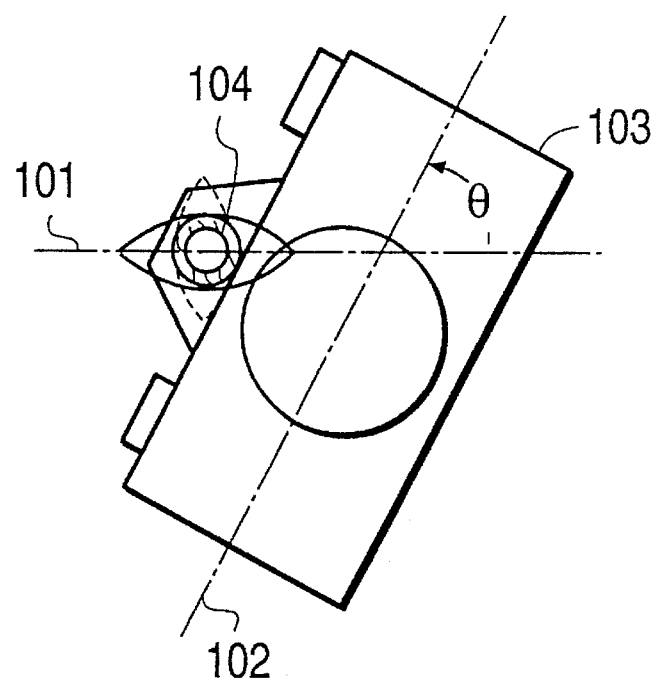
FIG. 13 is an illustration of a change of camera attitude.

In the above embodiments according to the present invention, it is a precondition that the attitude of the camera is normally fixed. In order to maintain the attitude under general conditions by the action of the visual line detection device, it is desirable to detect a rotation of the visual axis of the observer's eye relative to the amount of rotation of the eyeball and the camera. For most standard circumstances for the degrees of freedom of this rotation, as shown in FIG. 12, the horizontal axis 101 of the observer's eye and the horizontal axis 102 of the camera are in a parallel state. However, in actuality, according to the demands of photography, the two axes are not in agreement, as shown in FIG. 13. Most typically θ=±90° in many cases. In FIGS. 12 and 13, single lens reflex camera 103 uses a pentaprism (not illustrated). Eyeball 104 observes the visual field through a viewfinder ocular portion. The result of the relative rotation of the eyeball and the camera in FIG. 13 is that the correction amount $(x_0, y_0)$ of the point of scrutiny undergoes the following change:

$$\begin{bmatrix} \overline{x_0} \\ \overline{y_0} \end{bmatrix} \begin{bmatrix} \cos\theta & -\sin\theta \\ \sin\theta & \cos\theta \end{bmatrix} \begin{bmatrix} x_0 \\ y_0 \end{bmatrix} \quad \text{Eq. (3)}$$

From the above equation (3), the correction value corresponding to the amount θ of rotation is calculated as $$(\overline{x_0}, \overline{y_0})$$

and the point of scrutiny of the observer's eye can be found from the visual axis determination value by equations (2a) and (2b).

A photoelectric method is generally used to measure θ (for example, imaging the position of a portion of the eye, such as the corner of the eye). By measurement relative to camera standard coordinates, the horizontal axis 101 of eyeball 104 can be directly found. However, because the photographic frame is usually chosen with the horizontal axis of the observer's eye fixed, and only the attitude of the camera changing, the whole operation of measuring θ can be replaced by determining the attitude of the camera relative to an average horizon.

Figure 14:
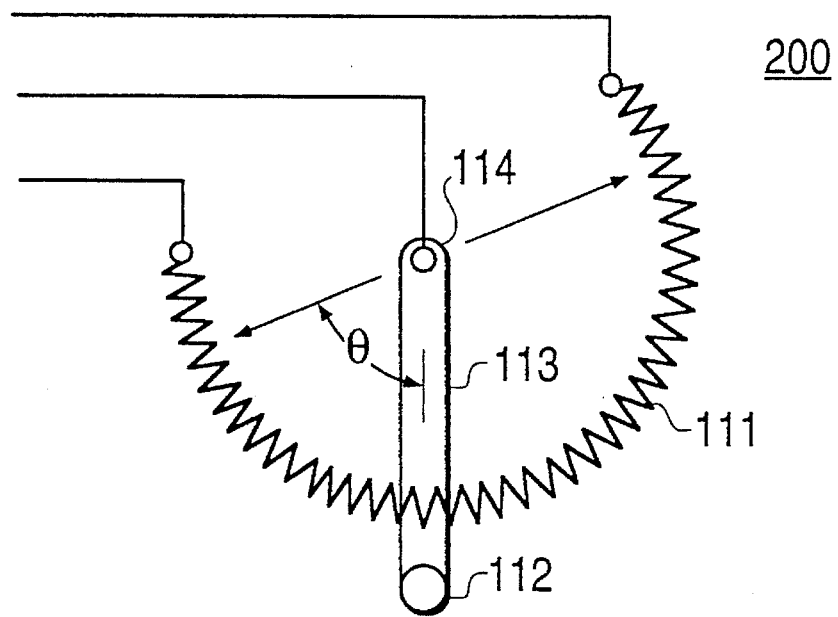
FIG. 14 is a schematic view of a camera attitude detector.

A detector 200, as shown in FIG. 14, can be used for this purpose. In FIG. 14, sliding element 113, attached to weight 112, points in a vertical direction. The angle of sliding element 113 on the resistor of potentiometer 111 is used to detect the attitude. Center of rotation 114 of the sliding element 113 is an output terminal for the tapped-off voltage.

Figure 15:
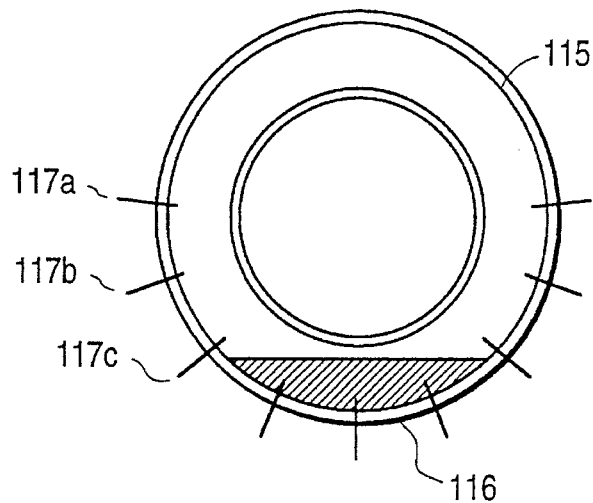
FIG. 15 is a schematic view of a camera attitude detector.

On the other hand, as shown in FIG. 15, a mercury switch 115 may be used with mercury sealed in a torus. By observing conduction between adjacent contact points 117a, 117b, etc., the location of mercury 116 sealed within torus 115 can be discriminated and, accordingly, the vertical direction can be detected. If attitude detectors 200 or 115 are built into a camera, the rotation of the camera can be discriminated and a correction to the visual axis measurement value from equation (3) according to the amount of rotation can be added. Therefore, accurate detection of the point of scrutiny is possible.

Figure 16:
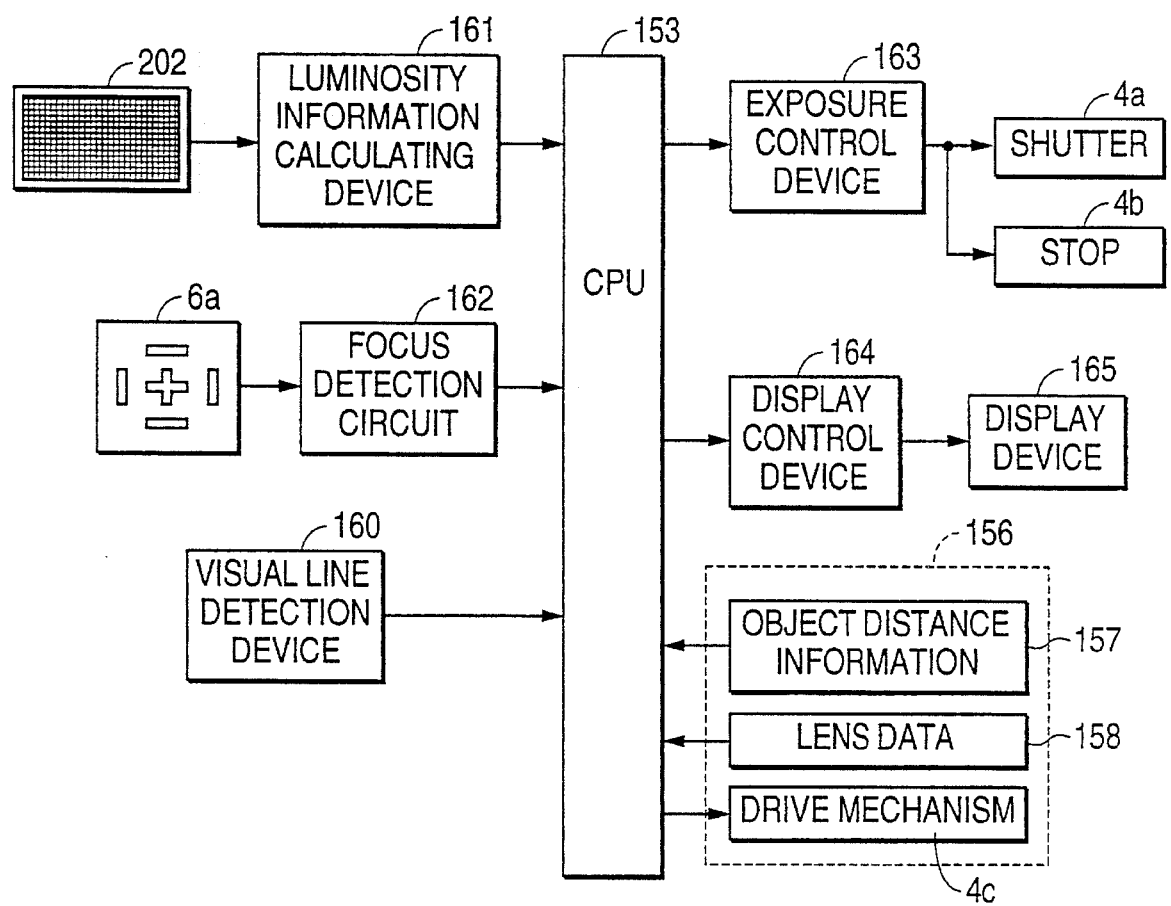
FIG. 16 is a block diagram of an embodiment of a camera according to the present invention.

FIG. 16 is a block diagram for describing an embodiment of a camera according to the present invention. The output of photometric element 202 is converted to a luminosity value by a well-known luminosity information calculating device 161 and is input to CPU 153.

Focus detection device 6a detects subject information at five regions: left, center, right, up, and down. Information is passed via focus detection circuit 162, which is also well-known, to CPU 153 where the focus position is determined.

Information concerning the point of scrutiny is transmitted to CPU 153 from visual line detection device 160. The object distance information X (mm) obtained from the position of objective lens 1, the stop value information of stop 4b, the focal length information f (mm), such as object distance information 157 and similar lens data 158 are input from photographic lens barrel 156 to CPU 153.

CPU 153 calculates the optimum exposure value EV, based on the input information, and displays it on display device 165 via display control device 164. Moreover, objective lens 1 is moved, using drive mechanism 4c, to the focus position which has been determined based on the focus information detected by focus detection device 6a.

After this, by depression of the release button (not illustrated), exposure control device 163 drives shutter 4a and stop 4b and controls the calculated exposure value EV.

Figure 17:
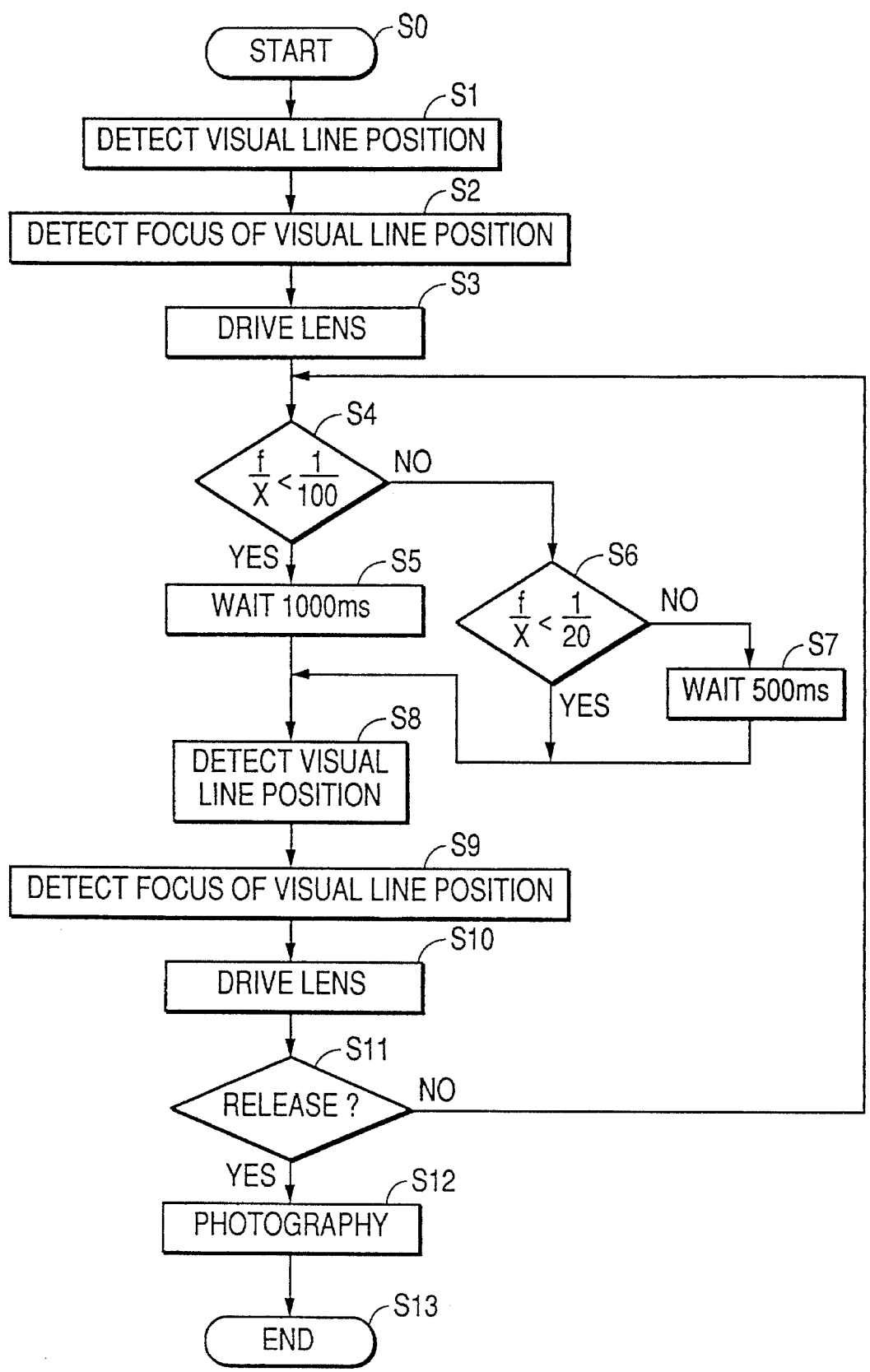
FIG. 17 is a first embodiment of the main operational sequence for a CPU for a camera according to the present invention.

FIG. 17 shows a first embodiment of the main operational sequences for the CPU 153 shown in FIG. 16.

The process starts at S0. In step S1, output signals relating to the point of scrutiny are input from the visual line detection device 160, and the position of the visual line is detected, based on these signals.

The focus position which corresponded to the visual line position detected in step S1 is detected in step S2.

Drive signals are output in step S3 to the drive mechanism 4c, and the photographic lens is moved to the focus position detected in step S2.

It is decided in step S4 whether or not the magnification f/X, which is the ratio of the focal length f to the object distance X, is smaller than 1/100. If it is smaller, proceeding to step S5, the program waits for 1000 ms. If not smaller, proceeding to step S6, it is decided whether or not the magnification f/X is smaller than 1/20. If it is smaller than 1/20, the program proceeds to step S8 and, if not smaller, proceeds to step S7 and waits for 500 ms.

In step S8, output signals relating to the latest position of the point of scrutiny are input from visual line detection device 160 and, based on these signals, the position of the visual line is again detected.

In step S9, the focus position is detected of the region which corresponds to the visual line position detected in step S8.

Output signals are output to drive mechanism 4c in step S10, and objective lens 1 is moved to the focus position detected in step S9.

In step S11, it is determined whether there has been full depression of the release button by the photographer; when the release button has not been fully depressed, the program returns to step S4, and if the release button was fully depressed, the program proceeds to step S12.

Photography is performed in step S12 and the process ends at S13.

In the above manner: (1) when the magnification is small (thereby indicating that landscape photography is being performed), the lens drive reaction is slowed by a time lag of 1000 ms; (2) when the magnification is medium (thereby indicating that "spot photography" or photography of people or a similar-type subject is being performed), the reaction of the lens drive to changes of the visual line position is made responsive; (3) when the magnification is large (thereby indicating that close-up photography is being performed), the reaction of the lens drive is somewhat slowed by arranging a medium time lag of 500 ms to changes of the visual line. Accordingly, camera control is based on the visual line detection and adjustments are made according to photographic circumstances related through the photographic lens.

Figure 18:
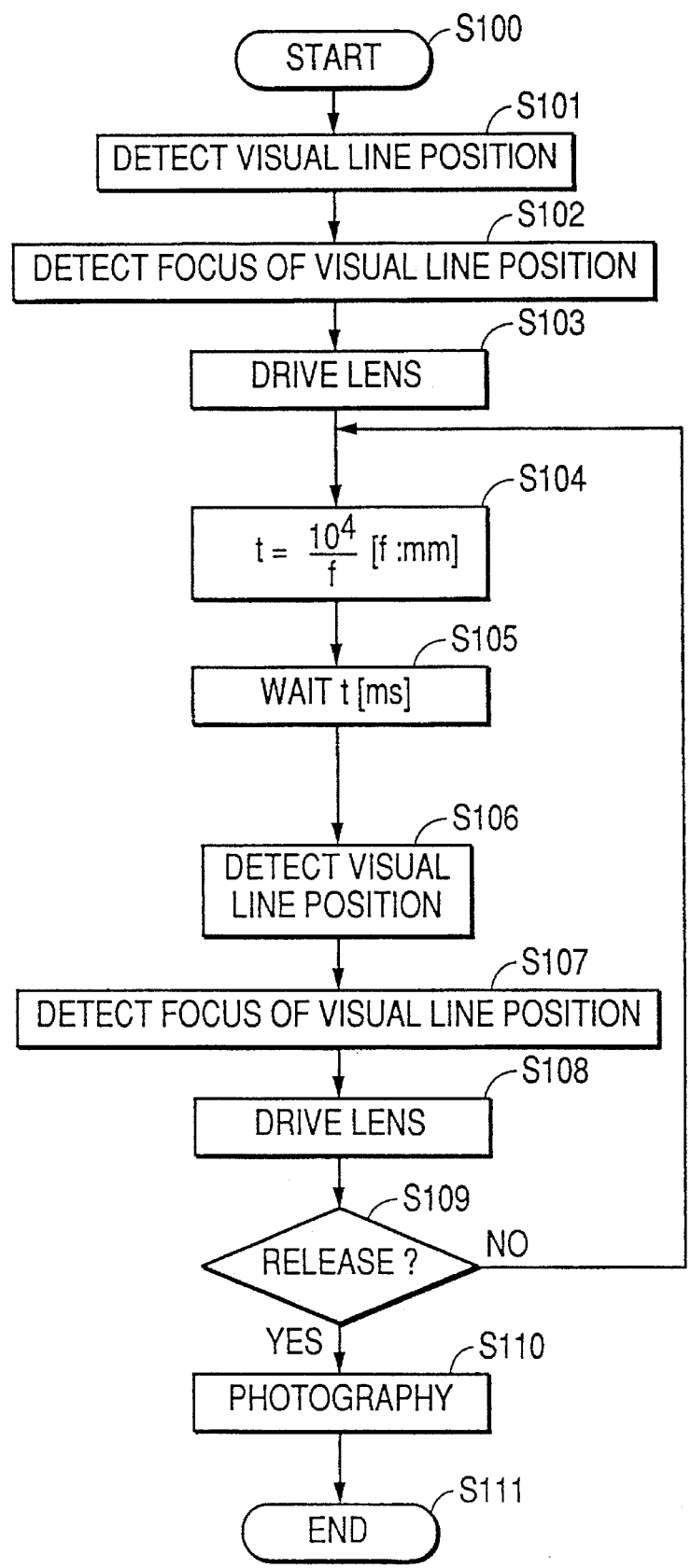
FIG. 18 is a second embodiment of the main operational sequence for a CPU for a camera according to the present invention.

FIG. 18 represents a second embodiment of the main operational sequences for the CPU 153 of FIG. 16.

The process starts at step S100. In step S101, output signals relating to the point of scrutiny are input from the visual line detection device 160, and the position of the visual line is detected, based on these signals.

The focus position which corresponded to the visual line position detected in step S101 is detected in step S102.

Drive signals are output in step S103 to drive mechanism 4c, and objective lens 1 is moved to the focus position detected in step S102.

In step S104, a waiting time t is calculated according to the equation $$t=10^4/f.$$

In step S105, the system waits for the time t calculated in S104. For example, when the focal length of the photographic lens is 24 mm, the wait time t=417 ms; at 300 mm, wait time t=33 ms.

In step S106, output signals relating to the latest position of the point of scrutiny are input from the visual line detection device 160 and, based on these signals, the position of the visual line is again detected.

In step S107, the focus position is detected of the region which corresponds to the visual line position detected in step S106.

Output signals are output to drive mechanism 4c in step S108, and objective lens 1 is moved to the focus position detected in step S107.

In step S109, it is determined whether there has been full depression of the release button by the photographer; when the release button has not been fully depressed, the program returns to step S104, and if the release button was fully depressed, the program proceeds to step S110.

Photography is performed in step S110 and the process ends at step S111.

In the above manner: (1) when the focal length for a particular photographic subject is short (thereby indicating that landscape photography is being performed), the lens drive reaction is slowed by a long time lag; (2) when the focal length is large (thereby indicating that spot photography is being performed, in which the visual line is practically fixed on the main subject), the reaction of the lens drive to changes of the visual line position is made responsive. Accordingly, camera control is based on the visual line detection and changes are made according to the photographic circumstances related through the photographic lens.

Figure 19:
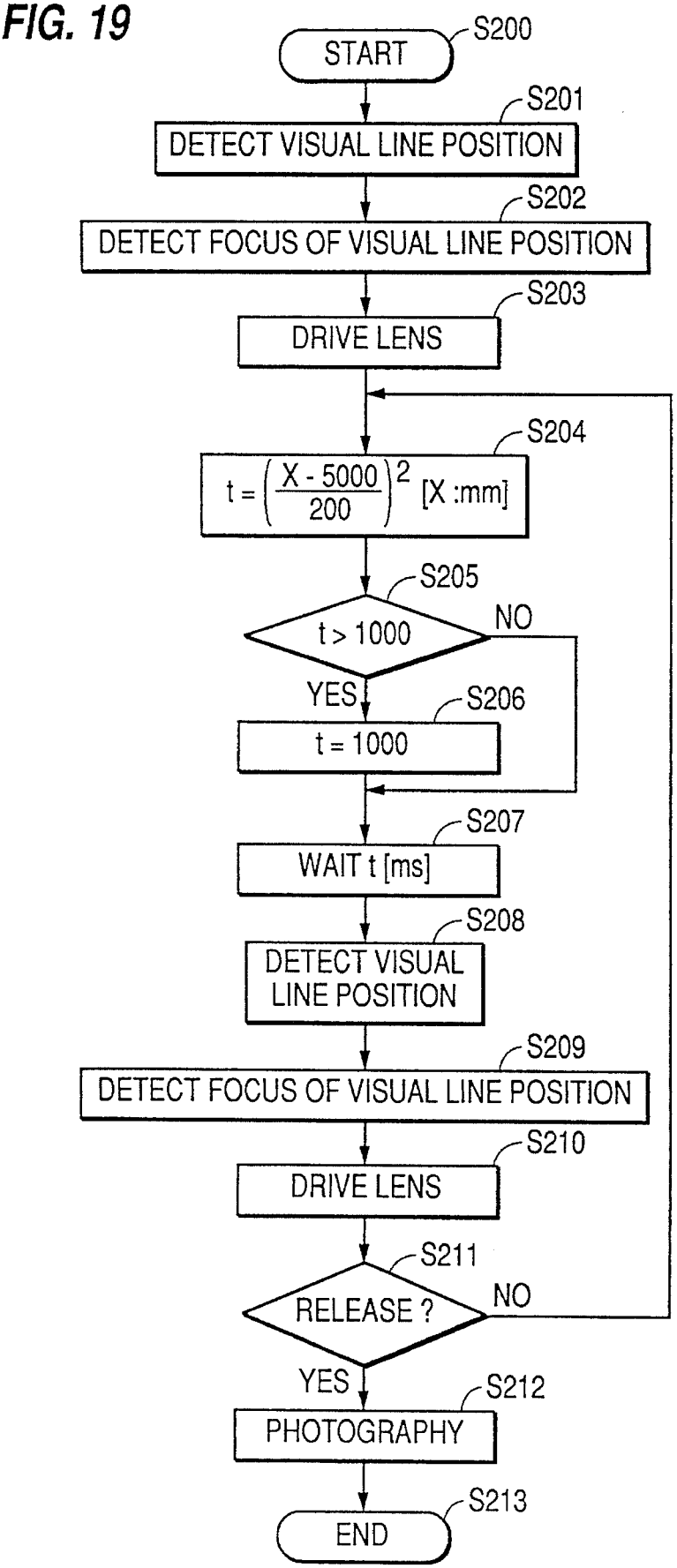
FIG. 19 is a third embodiment of the main operational sequence for a CPU for a camera according to the present invention.

FIG. 19 represents a third embodiment of the main operational sequences for the CPU 153 of FIG. 16.

The process starts at step S200. In step S201, output signals relating to the point of scrutiny are input from the visual line detection device 160, and the position of the visual line is detected, based on these signals.

The focus position which corresponds to the visual line position detected in step S201 is detected in step S202.

Drive signals are output in step S203 to drive mechanism 4c, and objective lens 1 is moved to the focus position detected in step S202.

In step S204, a waiting time t is calculated according to the equation:

$$t=(X-5000)/200)^2$$

In step S205 and step S206, a limit of 1000 ms is set for the waiting time calculated in step S204.

In step S207, there is a wait for the time calculated in S204. For example, when the object distance is 5000 mm (5 m), t=0 ms; at 1000 mm (10 m), t=625 ms; and at 20,000 mm (20 m), t=1000 ms.

In step S208, output signals relating to the latest position of the point of scrutiny are input from the visual line detection device 160 and, based on these signals, the position of the visual line is again detected.

In step S209, the focus position is detected of the region corresponding to the visual line position detected in step S208.

Output signals are output to drive mechanism 4c in step S210, and objective lens 1 is moved to the focus position detected in step S209.

In step S211, it is determined whether there has been full depression of the release button by the photographer; when the release button has not been fully depressed, the program returns to step S204, and if the release was fully depressed, the program proceeds to step S212.

Photography is performed in step S212.

In the above manner: (1) when the object distance is short (thereby indicating that spot photography or photography of persons or similar-type subjects is being performed), the visual field is practically fixed on the main subject and the reaction of the lens drive to changes of the visual line position is made responsive; (2) when the object distance is long (thereby indicating that landscape photography is being performed), the lens drive reaction is slowed by a long arranged time lag. Accordingly, camera control is based on the visual line detection and changes are made according to the photographic circumstances as related through the photographic lens.

Moreover, the camera of the present invention may be such that the photographic lens is detachable, or is not detachable, from the camera body.

The embodiments of the present invention are constituted by a camera having lens information storage means for storing information relating to a photographic lens, and visual line detection means for detecting the visual line position of an observer looking into an observation system to observe an object, and memory means for plural storage of control methods to control the action of the camera based on the visual line position detected by this visual line detection means, and selection means for selecting an optimum control method from plural control methods of the operation control means in response to the lens information stored in the lens information storage means, and action control means for controlling the action of the camera by an optimum control method selected by the selection means.

Figure 20:
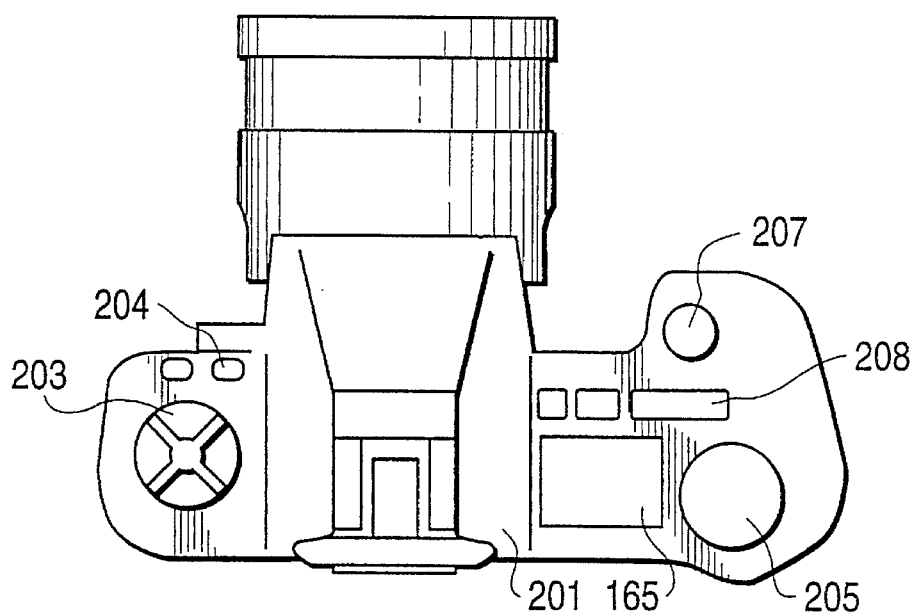
FIG. 20 is a top view of an embodiment of a camera according to the present invention.

FIG. 20 is a top view of an embodiment of a camera according to the present invention.

As shown in FIG. 20, the camera has a camera body 201 on which is arranged: dial 205 to change each type of information; an exposure control mode change button 203 used when selecting the program mode, shutter speed priority mode, stop priority mode, or manual mode; a photographic mode setting button 204, used when setting the portrait, spot, or the like photographic mode; a display device 165 to display the information necessary for photography; a release button 207; and an electric power supply switch 208.

The photographer, by rotating dial 205 while pressing mode change button 203, can select program mode (P), shutter priority mode (S), stop priority mode (A), or manual mode (M).

When the exposure control mode is in the program mode, a previously stored photographic mode can be selected when rotating dial 205 while depressing photographic mode setting button 204. This previously stored photographic mode is what is termed photographic software (Ps), and is a mode in which exposures for the performance of photography for special effects are previously programmed. Photographic software mode includes: portrait mode, giving the effect in which persons stand out against a vignette background; the landscape mode, to obtain sharp photographs with a deep depth of field; spot mode, to give the effect of standstill of an instantaneous movement; and close-up mode in which, while the subject is close up, a photograph is obtained with a comparatively deep depth of field.

The selection of these modes, when the exposure control mode is the program mode, is performed by rotating dial 205 while depressing photographic mode setting button 204.

Display device 165 can display symbols respectively for the above-mentioned P, S, A, M and Ps photographic software modes and can display the exposure values.

On depressing photographic mode setting button 204, one of the symbols for the photographic software modes is displayed on display device 165. The mode displayed at this time is the mode which was set on the previous occasion. Moreover, when beginning use, the camera is set in the portrait mode and the portrait mode is displayed.

On rotating dial 205, landscape mode is displayed, and on further rotation of the dial 205, the display changes over to spot mode then close-up mode. Thereafter, the display cycles back to portrait mode. The display changes over in a cycle by the operation of dial 205.

When photographic mode setting button 204 is released, the camera is set in the displayed mode; the exposure is controlled according to the program chart of the photographic mode set. Details of the control are given below.

Figure 21:
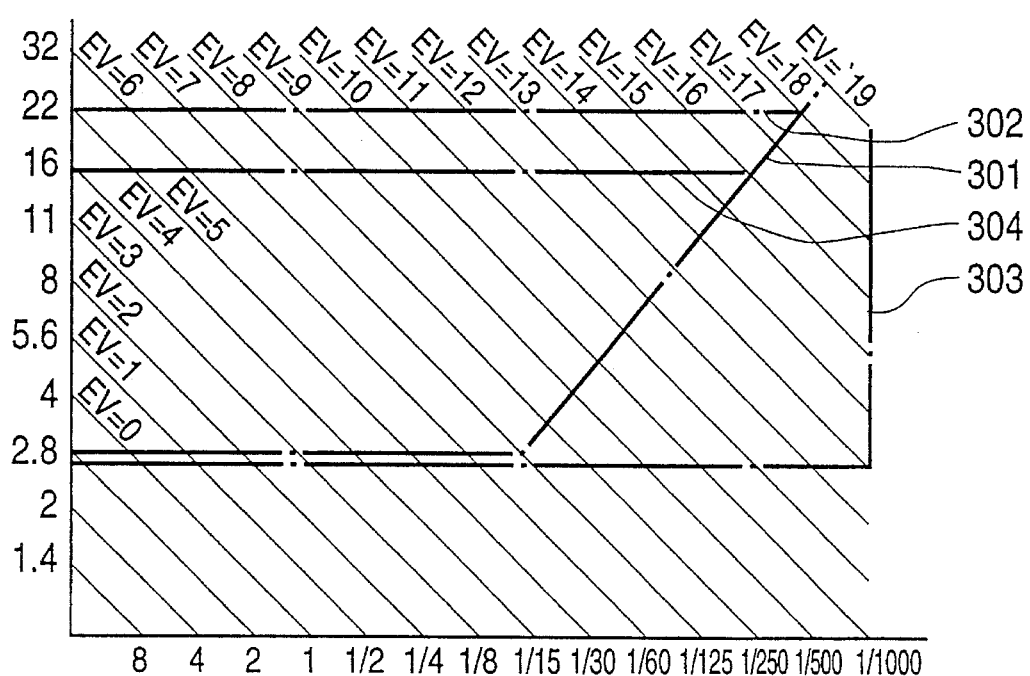
FIG. 21 is a program chart to control the exposure of an embodiment of a camera according to the present invention.

The program charts, shown in FIG. 21, correspond to the photographic software modes.

In FIG. 21, the ordinate is the stop number (F number), and the abscissa is the shutter speed (T); the oblique axis shows the exposure value (EV).

When the portrait mode is selected, the exposure is controlled according to the program chart 301. At Ev=−1 to 7, the control is such that the shutter speed T=2 to 1/15, and the stop value becomes F=2.8; at Ev=7 to 19, the control is to shutter speeds and stop values on the line joining shutter speed T=1/15, stop value F=2.8 to shutter speed T=1/1000, stop value F=32. By this method, in portrait mode, the background is a vignette and the persons stand out.

When landscape mode is selected, the exposure is controlled according to the program chart 302. At Ev=5 to 18, the control is such that the shutter speed T=15 to 1/500, and the stop value becomes F=22; at Ev=18 and above, the shutter speed and stop value are controlled in agreement with the above-mentioned program chart 301. In this manner, in landscape mode, sharp photographs are obtained with a deep depth of field.

When spot mode is selected, the exposure control is according to program chart 303. At Ev=−1 to 13, control is such that the shutter speed T=15 to 1/1000 and the stop value becomes F=2.8; at Ev=13 to 19, exposure control is at a shutter speed of 1/1000 and a stop value is in the range of F=2.8 to 22. In this manner, in spot mode, a stop motion effect is obtained with instantaneous movement being brought to a standstill.

When close-up mode is selected, exposure control is according to the program chart 304. At Ev=4 to 16, the control is such that the shutter speed becomes T=15 to 1/250, with a stop value of F=16; at Ev=16 to 19, exposure control is in agreement with the above-mentioned program chart 301. In this manner, in close-up mode, even while the subject is close up, photographs are obtained with a comparatively deep depth of field.

The action of this embodiment of the camera will next be described using FIGS. 22–26.

Figure 22:
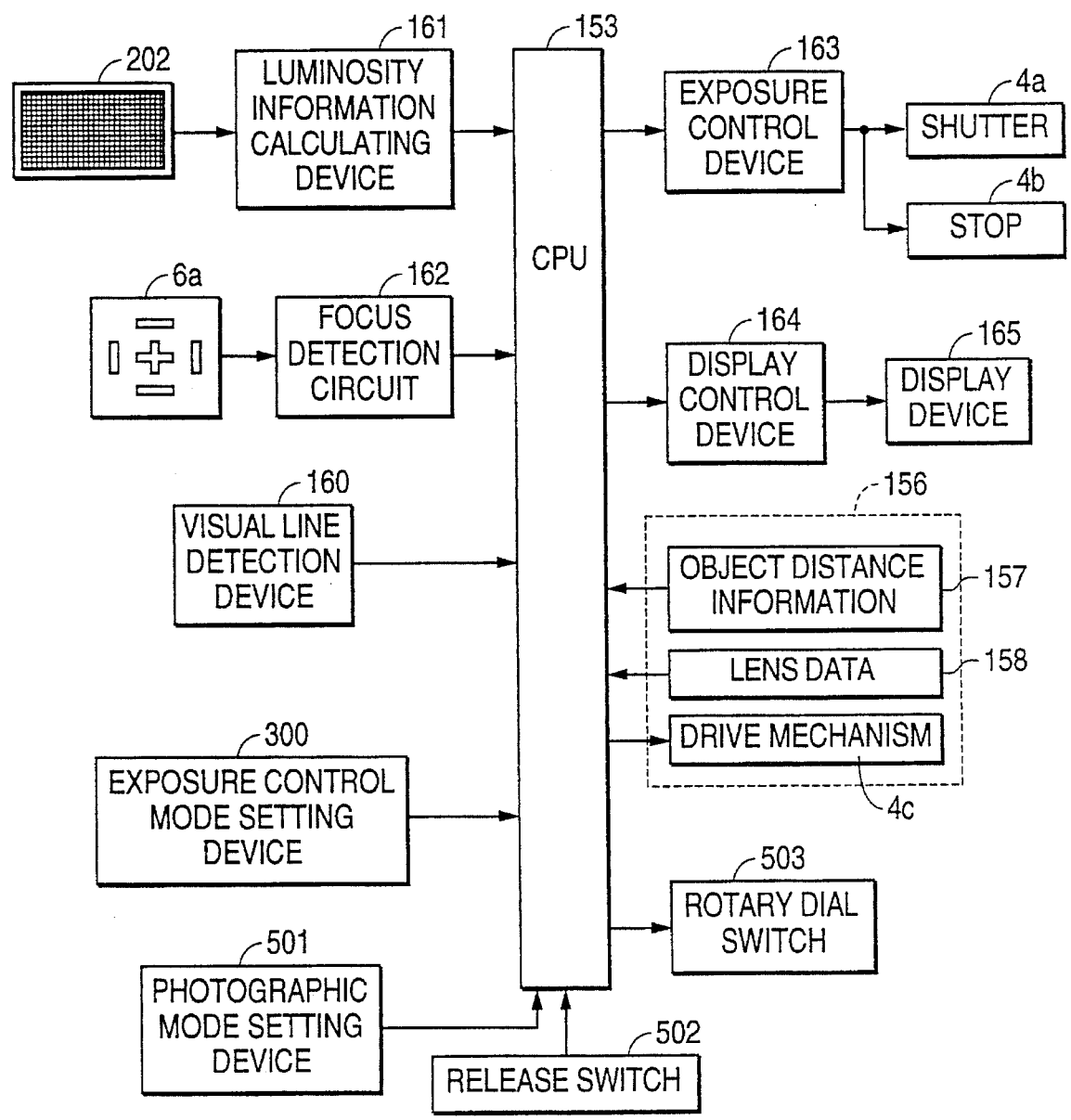
FIG. 22 is a block diagram of an embodiment of a camera according to the present invention.
Figure 23:
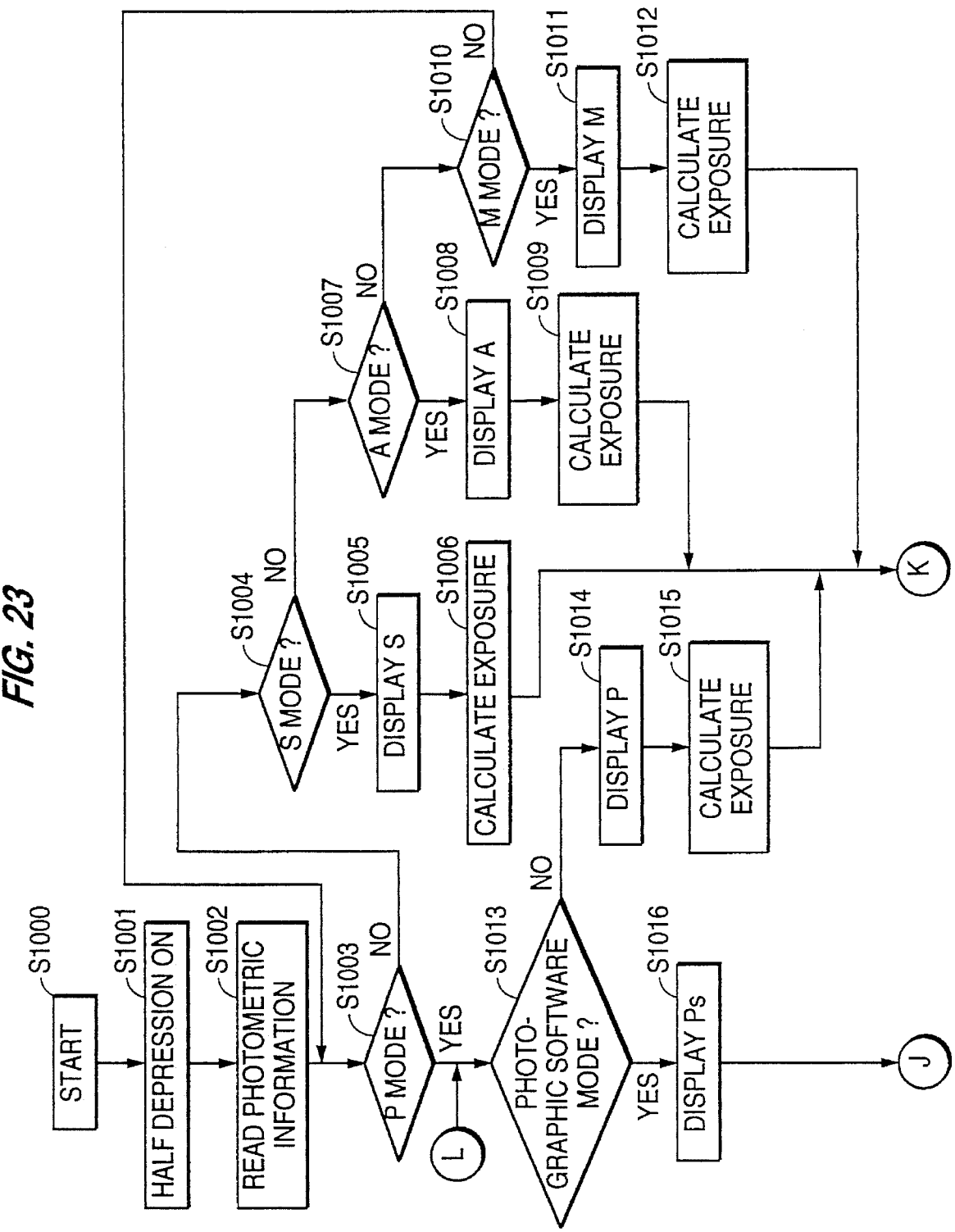
FIGS. 23–26 are diagrams illustrating additional embodiments of an operational sequence of a CPU for an embodiment of a camera according to the present invention.
Figure 24:
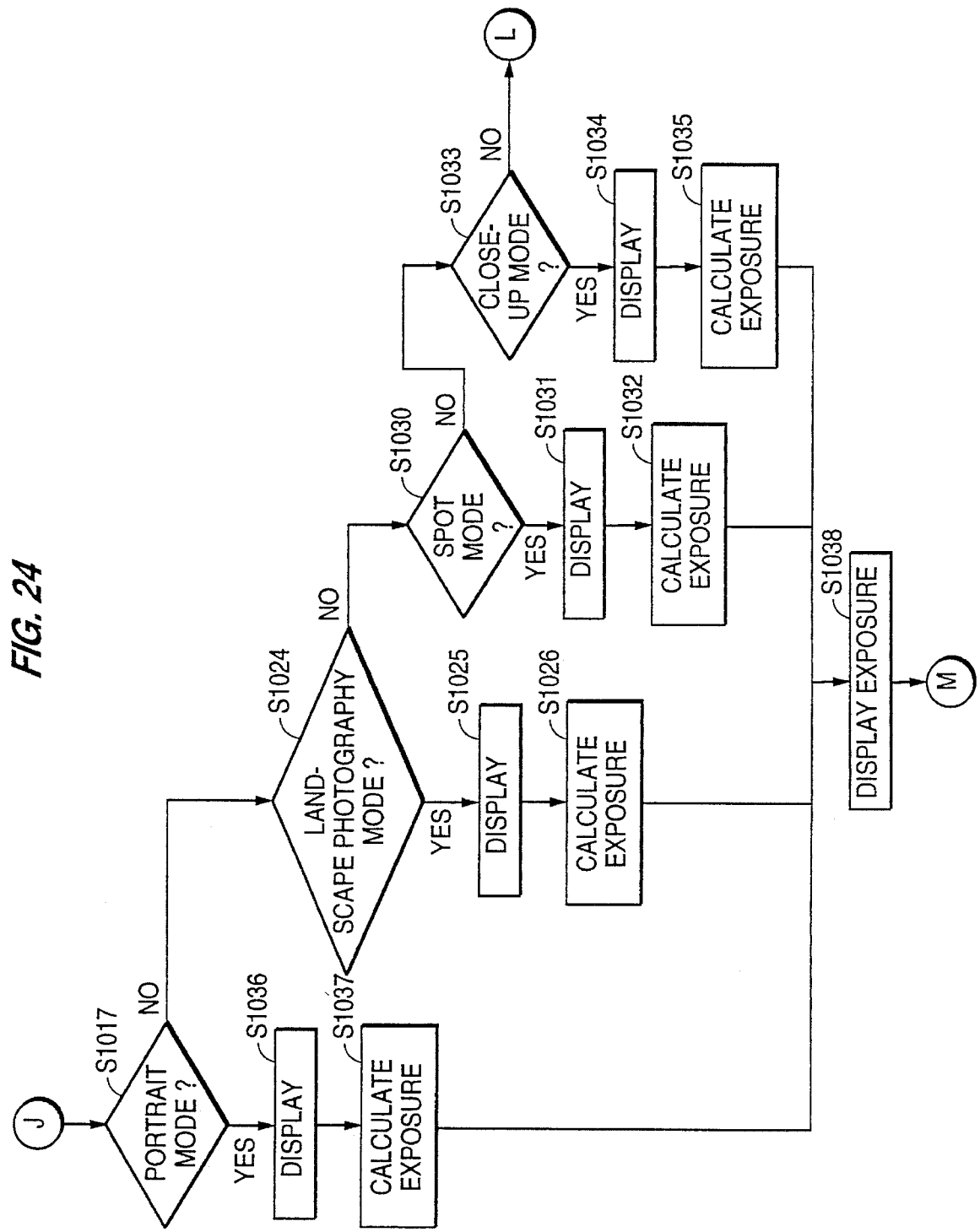
Figure 25:
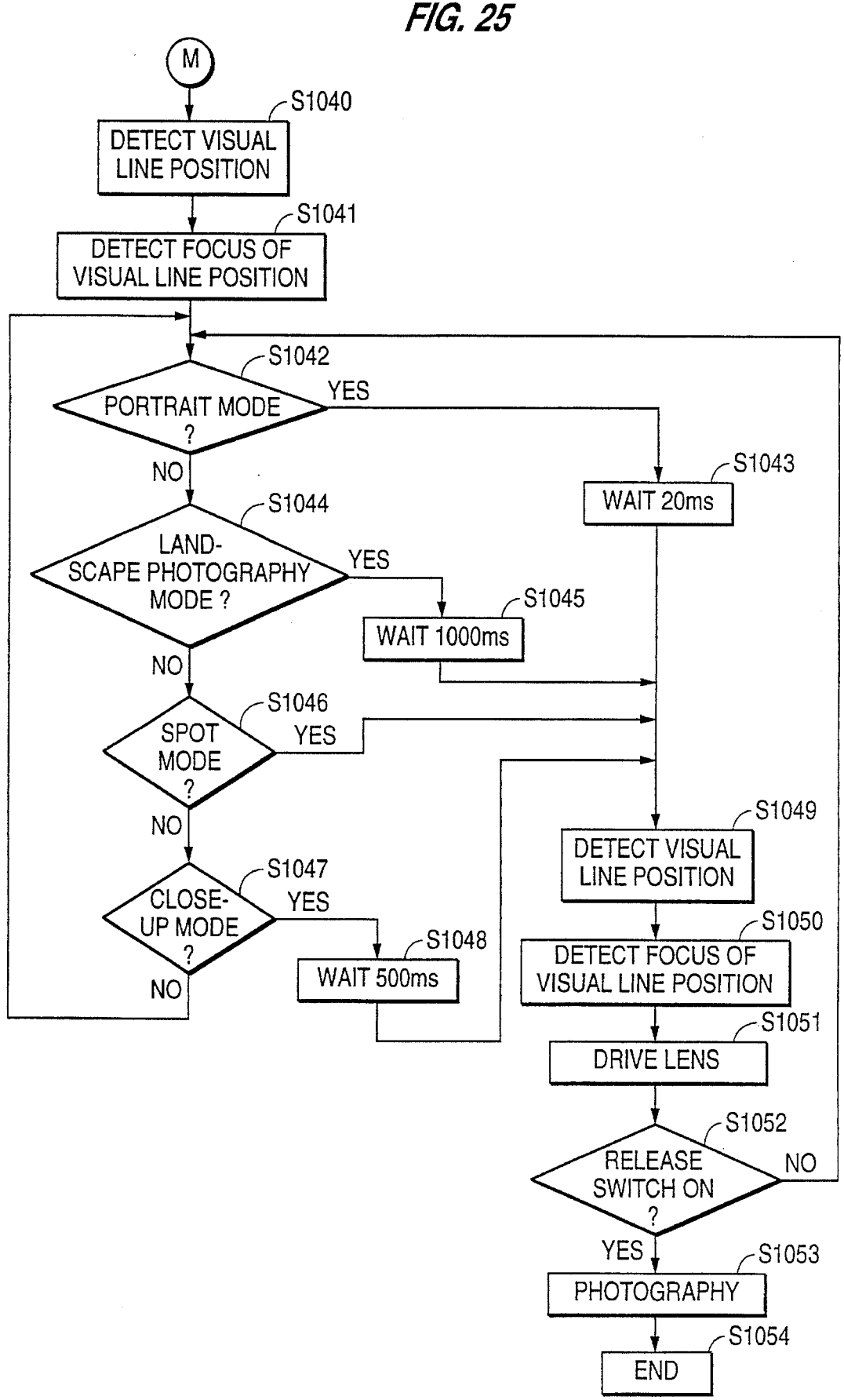
Figure 26:
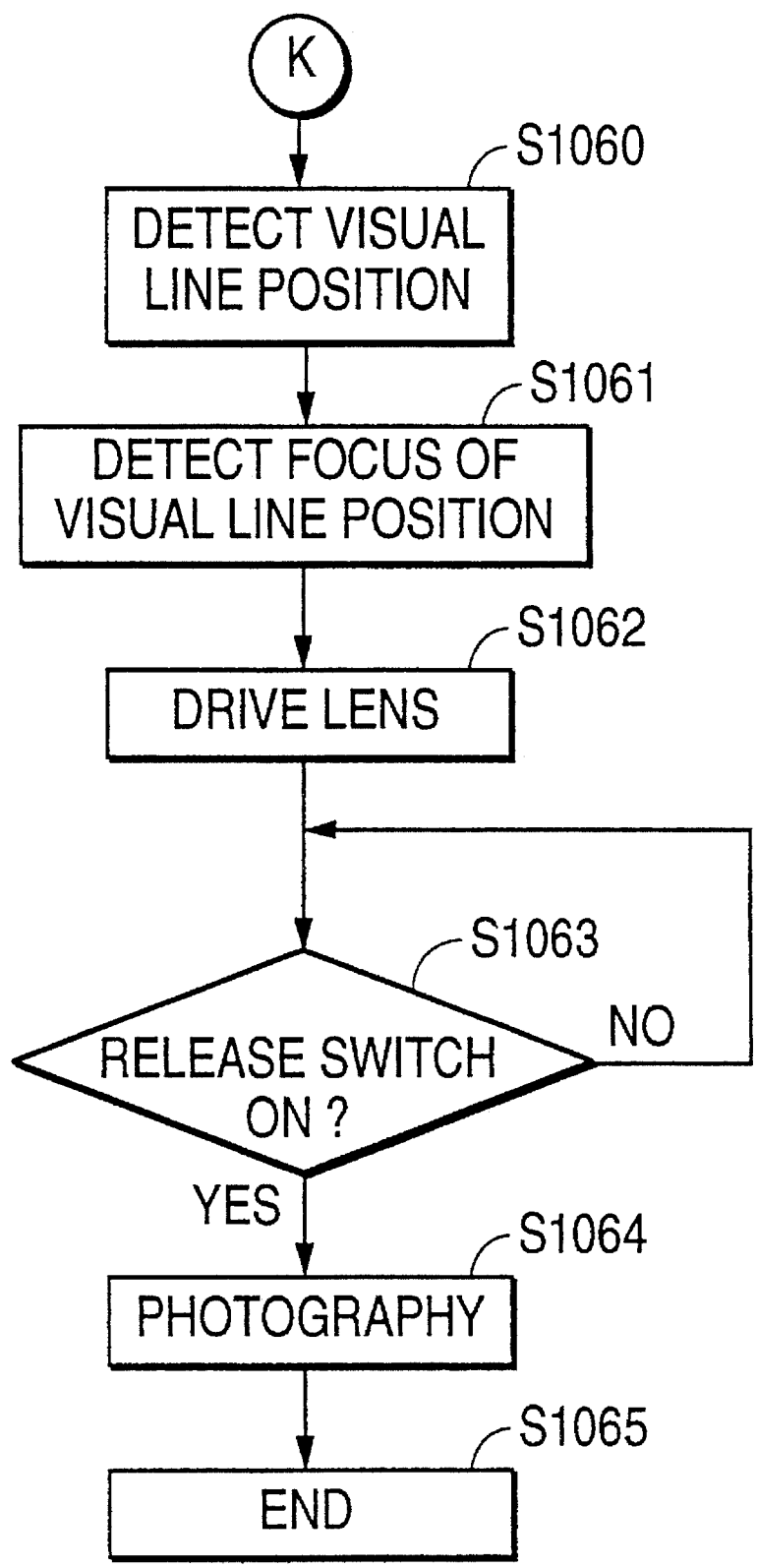

FIG. 22 is a block diagram of an embodiment of a camera according to the present invention.

The output of photometric element 202 is converted to a luminosity value by a well-known luminosity information calculating device 161 and is input to CPU 153.

Focus detection device 6a detects subject information at five regions: left, center, right, up, and down. Information is passed via a focus detection circuit 162, which is also well-known, to CPU 153 where the focus position is determined.

Information concerning the point of scrutiny is transmitted to CPU 153 from visual line detection device 160. The object distance information X (mm) obtained from the position of objective lens 1, the stop value information of stop 4b, the focal length information f (mm) and similar lens data (see blocks 157, 158) are input from photographic lens barrel 156 to CPU 153.

Moreover, the respective output signals from exposure control mode setting device 300 operated by the exposure control mode changeover button 203, the photographic mode setting device 501 operated by the photograph mode setting button 204, release switch 502 operated by release button 207, and a rotary dial switch 503 operated by the rotary dial 205, are input to CPU 153.

CPU 153 calculates the optimum exposure value EV, based on the input information, and displays it on display device 165 via the display control device 164. Moreover, objective lens 1 is moved, using drive mechanism 4c, to the focus position which was determined based on the focus information detected by focus detection device 6a.

After this, by depression of release button 207, exposure control device 163 drives shutter 4a and stop 4b, and controls the calculated exposure value EV.

FIGS. 23–26 are flow charts showing the operation of the CPU 153 in FIG. 22.

The process starts at step S1000. In step S1001, half depression of the release button 207 is detected by the output of release switch 502, and the program proceeds to step S1002. In step S1002, information is input from luminosity information calculating device 161, and the program proceeds to step S1003.

In step S1003, output signals are input from exposure control mode setting device 300 and, when the system is detected to be a program mode, the program proceeds to step S1013; when it is detected to be a mode other than program mode, the program proceeds to step S1004.

In step S1013, if it is detected by the output signal from photographic mode setting device 501 that a photographic software mode is selected and the program proceeds to step S1016; if not, the program proceeds to step S1014.

In step S1014, signals are output to display control device 164, and the P display is illuminated on display device 165. Then, in step S1015, the exposure is calculated by the output signal from luminosity information calculating device 161 and the program proceeds to step S1060.

In step S1016, a signal is output to display control device 164, the Ps display is illuminated on display device 165, and the program proceeds to step S1017.

In step S1017, a signal is input from photographic mode setting device 501 and, when the system is detected to be in portrait mode, proceeding to step S1036, a signal is output to display control device 164 and a symbol for the portrait mode is displayed on display device 165. Then, in step S1037, the exposure is calculated by the output signal from luminosity information calculating device 161 and the program proceeds to step S1038.

When it is detected in step S1017 that the system is not in portrait mode, it is determined in step S1024 whether or not it is in the landscape mode; if it is, the program proceeds to step S1025, and if not, to step S1027.

In step S1025, a signal is output to display control device 164, and a symbol for landscape mode is shown on display device 165. Then, in step S1026, from the output signal of luminosity information calculating device 161, the exposure is calculated based on the program chart, and the program proceeds to step S1038.

When it is detected in step S1024 that the system is not in landscape mode, it is determined in step S1030 whether or not the system is in spot mode; if so, the program proceeds to step S1031, and if not, to step S1033. In step S1031, a signal is output to the display control device 164, and a symbol for spot mode is shown on display device 165. Then, in step S1032, from the output signal of luminosity information calculating device 161, the exposure is calculated based on the program chart and the program proceeds to step S1038.

When it is detected in step S1030 that the system is not in landscape mode, it is determined in step S1033 whether or not the system is in spot mode; if so, the program proceeds to step S1034, and if not, to step S1013. In step S1034, a signal is output to display control device 164 and a symbol for close-up mode is shown on display device 165. Then, in step S1035, from the output signal of luminosity information calculating device 161, the exposure is calculated based on the program chart, and the program proceeds to step S1038.

When it is determined in step S1003 that the system is not in a program mode, it is determined in step S1004 whether or not the system is in the shutter priority mode; if so, the program proceeds to step S1005, and if not, to step S1007.

In step S1005, a signal is output to display control device 164, and the S display is illuminated on display device 165. Then, in step S1006, the exposure is calculated from the output signal of luminosity information calculating device 161, and the program proceeds to step S1060.

In step S1007, it is determined whether or not the system is in the stop priority mode A; if so, the program proceeds to step S1008, and if not, to step S1010. In step S1008, a signal is output to display control device 164, and the A display is illuminated on display device 165. Then in step S1009, the exposure is calculated from the output signal of luminosity information calculating device 161, and the program proceeds to step S1060.

In step S1010, it is determined whether or not the system is in the manual mode M; if not, the program proceeds to step S1003. In step S1011, a signal is output to the display control device 164, and the M display is illuminated on the display device 165. Then, in step S1012, the exposure is calculated from the output signal of luminosity information calculating device 161, and the program proceeds to step S1060.

In step S1038, the calculated exposure signal is output to the display control device 164, and display of the exposure is performed; the program proceeds to step S1040.

In step S1040, output signals relating to the point of scrutiny are input from visual line detection device 160, and the position of the visual line is detected, based on these signals.

In step S1041, the focus position is detected, corresponding to the visual line position detected in step S1040.

It is detected in step S1042 whether or not the system is in portrait mode; if so, proceeding to step S1043, the program waits for 200 ms, then proceeds to step S1049.

In the case that the system is not in portrait mode in step S1042, proceeding to step S1044, it is determined whether or not the system is in landscape mode; if so, proceeding to step S1045, the program waits for 1000 ms, then proceeds to step S1049.

In the case that the system is not in landscape mode in step S1044, proceeding to step S1046, it is determined whether or not the system is in spot mode; if so, the program proceeds to step S1049.

In the case that the system is not in spot mode in step S1046, proceeding to step S1047, it is determined whether or not the system is in close-up mode; if so, the program waits for 1000 ms in step S1048, then proceeds to step S1049.

In the case that the system is not in spot mode in step S1047, the program returns to step S1042.

In step S1049, output signals relating to the latest point of scrutiny are input from the visual line detection device 160, and the position of the visual line is detected, based on these signals.

In step S1050, the focus position is detected, corresponding to the visual line position detected in step S1049.

Drive signals are output in step S1051 to drive mechanism 4c, and objective lens 1 is moved to the focus position detected in step S1050.

In step S1051, it is determined whether there has been full depression of the release button by the photographer; when it has not been fully depressed, the program returns to step S1004, and if it was fully depressed, the program proceeds to step S1052.

In step S1052, photography is performed, and the operational sequence ends.

In step S1060, output signals relating to the latest point of scrutiny are input from the visual line detection device 160, and the position of the visual line is detected, based on these signals.

In step S1061, the focus position is detected, corresponding to the visual line position detected in step S1060. Drive signals are output in step S1062 to drive mechanism 4c, and objective lens 1 is moved to the focus position detected in step S1061.

In step S1063, there has been full depression of the release button by the photographer, and the program proceeds to step S1064.

Photography is performed in step S1064, and the operational sequence ends.

In the above manner: (1) in the case of landscape photography (in which it is largely a case of viewing the composition everywhere in the picture), the lens drive reaction is slowed by a long time lag (1000 ms), even if the visual line is changed; (2) in the case of portrait photography (in which it is necessary to catch instantaneous gestures even while viewing of the composition of the picture), a very small amount of time lag to changes in the position of the visual line is arranged, and the lens drive reaction is very slightly slowed, by 200 ms; (3) with close-up photography, the differences in the depth of field due to the focus position and the composition are important and, therefore, a moderate time lag of 500 ms to changes in the position of the visual line is arranged and the lens drive reaction is somewhat slowed; (4) in the case of spot photography (in which the visual line is fixed on the main subject), the reaction of the lens drive to changes of the visual line position is made responsive.

In the present embodiment, a camera is disclosed of which the photographic lens is detachable from the body portion. However, the present invention is not limited to this type of camera.

Moreover, the time lags of the present embodiment are by way of example, and can be modified according to the circumstances of use.

The embodiments according to the present invention provide a camera, controlling shutter speeds and stop values based on a program chart selected by means of selection means, first memory means having plural program charts providing for shutter speeds and stop values to obtain special picture effects when photographed, and selection means for selecting one from among the program charts stored in the first memory means. The camera has a visual line detection means for detecting the visual line position of an observer looking into an observation system to observe an object, and second memory means for plural storage of control methods for controlling the action of the camera based on the visual line position detected by this visual line detection means, and action control means for controlling the action of the camera by an optimum control method selected from the second memory means. The optimum control method is based on the program chart selected by the selection means.

In the camera according to the present invention, the photographer can freely select a photographic mode which can obtain specific picture effects. Furthermore, the camera control based on the visual line detection is modified in response to the photographic mode. As a result, a camera is provided having a visual line detection device which, for control, takes account of the photographic conditions and provides ease of operation.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:

an adjustable lens through which photographic information relating to a photographic measurement is obtained;

a visual line detection unit detecting the visual line of a photographer; and a control device adjusting the lens in accordance with the visual line detected by the visual line detection unit and causing the adjustment of the lens to pause for a predetermined time based on the photographic measurement, wherein the predetermined time is increased as the value of the photographic measurement is reduced.

2. A camera as in claim 1, wherein the control device causes the drive to pause by inhibiting the visual line detection unit from detecting the visual line for the predetermined time.

3. A camera as in claim 1, wherein the photographic information obtained through the lens includes the focal length and the distance to a photographic subject, and the control device causes the drive to pause based on the focal length and the distance obtained through the lens.

4. A camera as in claim 3, wherein the photographic measurement is the photographic magnification and the camera further comprises a calculation device calculating the photographic magnification from the focal length and the distance, and producing a corresponding calculation result.

5. A camera as in claim 4, wherein the control device sets the predetermined time in accordance with the calculation result produced by the calculation device.

6. A camera as in claim 5, wherein the control device sets the predetermined time to be longer as the photographic magnification decreases.

7. A camera as in claim 1, wherein the photographic information obtained through the lens includes the focal length, the photographic measurement is the focal length, and the control device causes the drive to pause based on the focal length.

8. A camera as in claim 7, wherein the control device sets the predetermined time to be longer as the focal length decreases.

9. A camera as in claim 1, wherein the photographic information obtained through the lens includes the distance to a photographic subject, and the control device causes the drive to pause based on the distance obtained through the lens.

10. A camera as in claim 9, wherein the photographic measurement is the magnification, the magnification is determined in accordance with the distance obtained through the lens, and the control device sets the predetermined time to decrease as the distance to a photographic subject decreases.

11. A camera comprising:

an adjustable lens through which information relating to a photographic measurement is obtained, the information including at least one of the focal length and the distance to a photographic subject, the lens being adjustable to focus of the lens;

a visual line detection unit detecting the visual line of a photographer; and a control device adjusting the lens to focus the lens in accordance with the visual line detected by the visual line detection unit and causing the adjustment of the lens to pause for a predetermined time based on the photographic measurement, wherein the predetermined time is increased as the value of the photographic measurement is reduced.

12. A camera as in claim 11, wherein the lens is detachable from the camera.

13. A camera which performs a camera operation and comprising:
- a memory device storing data relating to program charts providing shutter speeds and apertures values to obtain specific photographic effects;
- a selection device allowing data relating to a specific program chart stored in the memory device to be selected;
- a visual line detection unit detecting the visual line of a photographer; and
- a photographic control device controlling the camera operation performed by the camera and causing the camera operation to pause for a period of time based on the visual line detected by the visual line detection unit and data relating to a specific program chart selected by the selection device.

14. A camera as in claim 13, wherein the selection device selects data relating to a specific program chart, and the photographic control device inhibits the visual line detection unit from detecting the visual line in accordance with the data relating to the specific program chart selected by the selection device.

15. A camera as in claim 13, further comprising:
- an adjustable lens which is adjustable to focus the lens, wherein the camera operation performed by the camera is the adjustment of the lens to focus of the lens and the photographic control device causes the adjustment of the lens to pause for a period of time based on data relating to a specific program chart selected by the selection device.

16. A camera as in claim 13, wherein the program charts include at least one of a program chart for use in portrait photography and a program chart for use in landscape photography.

17. A camera as in claim 13, wherein
- the program charts include a program chart for use in portrait photography, a program chart for use in landscape photography, and a program chart for use in close-up photography, and
- the photographic control device sets the period of time to be shorter when the selection device selects data relating to the program chart for use in close-up photographer as compared to when the selection device selects data relating to the program chart for use in portrait photography.

18. A camera as in claim 13, wherein
- the program charts include a program chart for use in portrait photography, a program chart for use in landscape photography, and a program chart for use in close-up photography, and
- the photographic control device sets the period of time to be shorter when the selection device selects the data relating to the program chart for use in close-up photographer as compared to when the selection device selects data relating to the program chart for use in landscape photography.

* * * * *